US008313371B1

(12) United States Patent
Luciano, Jr.

(10) Patent No.: US 8,313,371 B1
(45) **Date of Patent: *Nov. 20, 2012**

(54) METHOD AND APPARATUS FOR AWARDING COMPONENT PRIZES IN A GAMING ENVIRONMENT

(75) Inventor: Robert Anthony Luciano, Jr., Reno, NV (US)

(73) Assignee: Bally Gaming, Inc., Las Vegas, NV (US)

(*) Notice: Subject to any disclaimer, the term of this patent is extended or adjusted under 35 U.S.C. 154(b) by 714 days.

This patent is subject to a terminal disclaimer.

(21) Appl. No.: 09/870,329

(22) Filed: May 31, 2001

Related U.S. Application Data

(63) Continuation-in-part of application No. 09/788,168, filed on Feb. 15, 2001, now Pat. No. 6,758,757, which is a continuation-in-part of application No. 09/742,679, filed on Dec. 20, 2000, now Pat. No. 6,923,721.

(51) Int. Cl.
*G06F 19/00* (2006.01)
*A63F 1/00* (2006.01)
*A63F 1/04* (2006.01)
*A63F 13/00* (2006.01)
*A63F 3/06* (2006.01)
*A63F 3/08* (2006.01)

(52) U.S. Cl. ................ 463/25; 463/16; 463/17; 463/18; 463/19; 463/24; 463/29; 273/138.1; 273/139

(58) Field of Classification Search .................. 273/138, 273/138.1–139, 459–460; 463/1, 200, 25, 463/15–30, 9–13, 40–43; 705/14, 18
See application file for complete search history.

(56) References Cited

U.S. PATENT DOCUMENTS 4,339,798 A 7/1982 Hedges et al.
4,398,720 A 8/1983 Jones et al.
4,948,138 A 8/1990 Pease et al.
4,964,642 A 10/1990 Kamille
5,257,784 A * 11/1993 Boylan et al. .................. 463/18
5,365,575 A 11/1994 Katz
5,370,399 A 12/1994 Liverance
5,429,361 A 7/1995 Raven et al.
5,470,079 A 11/1995 LeStrange et al.
5,573,244 A 11/1996 Mindes
5,577,185 A * 11/1996 Tunnell et al. ................ 345/473
5,586,766 A 12/1996 Forte et al.
5,655,961 A * 8/1997 Acres et al. ..................... 463/27
5,697,611 A * 12/1997 Kelly et al. ............... 273/126 A
5,702,304 A * 12/1997 Acres et al. ..................... 463/29
5,709,603 A * 1/1998 Kaye .............................. 463/17

(Continued)

*Primary Examiner* — David L Lewis
*Assistant Examiner* — William H McCulloch, Jr
(74) *Attorney, Agent, or Firm* — Steptoe & Johnson LLP

(57) ABSTRACT

A system and method for playing component games in a gaming environment, where a component game is a game in which a physical prize, the prize to be won, is rendered in a graphical format and further divided into components (clearly recognizable parts of the graphical image). Individual component prizes are designed to be won by a player during individual game plays, that is, upon the occurrence of specific winning events while playing a chance or fixed-pool game. To win the component game prize, each of the components must be won and the combination redeemed. The component prizes are not intended to be separately redeemable game credits. In particular, the player may play for regular game credits or may choose to play for component prizes or portions thereof, not both. Component games create a highly enticing situation where players can be rewarded for long term play over a variety of machines.

21 Claims, 16 Drawing Sheets

U.S. PATENT DOCUMENTS 5,743,800 A 4/1998 Huard et al.
5,751,707 A 5/1998 Voit et al.
5,810,666 A * 9/1998 Mero et al. .................... 463/41
5,816,918 A 10/1998 Kelly et al.
5,830,068 A 11/1998 Brenner et al.
5,836,817 A * 11/1998 Acres et al. .................... 463/26
5,855,514 A 1/1999 Kamille
5,882,258 A * 3/1999 Kelly et al. .................... 463/11
5,908,209 A * 6/1999 Carides et al. .................. 283/81
5,909,793 A 6/1999 Beach
5,928,082 A * 7/1999 Clapper, Jr. .................... 463/16
5,931,467 A 8/1999 Kamille
5,947,820 A 9/1999 Morro
5,996,997 A 12/1999 Kamille
5,999,808 A 12/1999 LaDue
6,015,344 A * 1/2000 Kelly et al. .................... 463/16
6,019,374 A 2/2000 Breeding
6,024,640 A 2/2000 Walker et al.
6,056,289 A * 5/2000 Clapper, Jr. ................ 273/138.2
6,068,552 A 5/2000 Walker et al.
6,165,071 A * 12/2000 Weiss .............................. 463/24
6,179,710 B1 * 1/2001 Sawyer et al. .................. 463/16
6,203,430 B1 3/2001 Walker et al.
6,227,972 B1 5/2001 Walker et al.
6,237,913 B1 5/2001 Kamille
6,251,017 B1 * 6/2001 Leason et al. .................. 463/42
6,267,672 B1 * 7/2001 Vance ............................ 463/29
6,306,038 B1 10/2001 Graves et al.
6,311,976 B1 * 11/2001 Yoseloff et al. ............ 273/138.2
6,319,122 B1 11/2001 Packes, Jr. et al.
6,364,314 B1 * 4/2002 Canterbury .................. 273/274
6,390,921 B1 * 5/2002 Busch et al. .................. 463/42
6,454,647 B1 * 9/2002 Woodbury, Jr. ................ 463/16
6,500,066 B1 * 12/2002 Bower et al. .................. 463/20
6,527,638 B1 3/2003 Walker et al.
6,533,273 B2 3/2003 Cole et al.
6,592,456 B2 * 7/2003 Walker et al. .................. 463/13
6,605,001 B1 * 8/2003 Tarantino ........................ 463/22
6,607,441 B1 * 8/2003 Acres .............................. 463/25
6,612,574 B1 9/2003 Cole et al.
6,612,575 B1 * 9/2003 Cole et al. .................. 273/138.1
6,616,531 B1 * 9/2003 Mullins .......................... 463/19
6,645,074 B2 * 11/2003 Thomas et al. ................ 463/20
6,656,042 B2 * 12/2003 Reiss et al. .................... 463/17
6,656,047 B1 12/2003 Tarantino et al.
6,656,050 B2 * 12/2003 Busch et al. .................. 463/42
6,758,757 B2 * 7/2004 Luciano et al. ................ 463/43
6,852,031 B1 * 2/2005 Rowe .............................. 463/29
6,923,721 B2 * 8/2005 Luciano et al. ................ 463/24
RE38,812 E * 10/2005 Acres et al. .................... 463/26
6,970,833 B1 * 11/2005 Fuchs ............................ 705/1.4
7,118,476 B1 * 10/2006 White et al. .................. 463/17
7,192,352 B2 3/2007 Walker et al.
7,490,830 B2 * 2/2009 Mirandette et al. .......... 273/139
7,682,244 B1 * 3/2010 Luciano et al. ................ 463/25
8,062,125 B2 * 11/2011 Luciano et al. ................ 463/25
8,113,947 B2 * 2/2012 Hornik et al. .................. 463/25
2001/0009865 A1 7/2001 Demar et al.
2002/0077173 A1 * 6/2002 Luciano et al. ................ 463/25
2002/0094871 A1 * 7/2002 Luciano et al. ................ 463/43
2002/0111210 A1 * 8/2002 Luciano et al. ................ 463/29
2003/0050109 A1 * 3/2003 Caro et al. .................... 463/17
2003/0100356 A1 * 5/2003 Brown et al. .................... 463/9
2010/0144418 A1 * 6/2010 Luciano et al. ................ 463/17
2010/0151936 A1 * 6/2010 Luciano et al. ................ 463/25
2011/0045900 A1 * 2/2011 Luciano, Jr. .................. 463/25
2012/0071233 A1 * 3/2012 Luciano et al. ................ 463/25
2012/0108313 A1 * 5/2012 Luciano et al. ................ 463/17

* cited by examiner

Example Award Credit Or Component Award System

Meta-Games According To
The Present Invention

Award Credit Or Component Award Accounting With Back End Validation Device

Example Voucher

Game Device And Prize Or Component Station On One Physical Machine

Award Credits Or Component Prizes And Awards On Multiple Machines

Game State Devices In A Networked Environment

Game Device Details

Gaming Device Details

Prize Station Device Details

Further Meta-Game Examples

Game State Saving Game
With Credits

Game State Saving Game
With Skill Points

Example Component Playing Pieces, Partial Components, And Component Lists

General Bearer Instrument (GBI) Service Station
Or Component Bearer Instrument (CBI) Service Station Example Use Of GBI And CBI Service Station

METHOD AND APPARATUS FOR AWARDING COMPONENT PRIZES IN A GAMING ENVIRONMENT

RELATED APPLICATIONS

This application is a continuation in part of application Ser. No. 09/788,168 filed 15 Feb. 2001 now U.S. Pat. No. 6,758,757, which is a continuation in part of application Ser. No. 09/742,679 filed 20 Dec. 2000 now U.S. Pat. No. 6,923,721.

BACKGROUND OF THE INVENTION

1. Field of the Invention

This invention pertains generally to gaming systems. More particularly, the present invention relates to a method and apparatus for awarding prizes in a manner that encourages long term interest and continuing play by players using saved award states in the form of components to a prize.

2. The Prior Art

Gaming devices of various types have been in use for many years. The most common type is the conventional slot. A player operates a slot machine by providing coin or paper monies that are received as game credits towards playing a game on the slot machine. Some machines allow a user to provide game credits in the form of a voucher, a printed coupon or a data card (e.g. magnetic strip or smart card). Once the sufficient amount of game credits has been provided to constitute a wager, the player then initiates the game, normally by pulling a handle or activating a button. If a winning event occurs, where a winning event is defined by the game being played, the slot machine issues a winning amount according to the player's wager and to a predetermined pay scheme. The game results are generally based on randomly generated events. The winning amount issued to the user is provided by a corresponding amount of game credits, which the player may redeem (cash-out) or use for further play on the slot machine. Similar game play and award schemes are provided according to other gaming devices such as video poker machines and keno machines.

Bonus awards and bonus game play were introduced as improvements to conventional gaming devices to entice increased game play. A common bonus enticement is to award a player a chance to multiply the player's award winnings from a primary game on a secondary, or bonus, stage of the game. Most bonus awards are simply an increased multiple of the primary winnings and are issued as game credits on the game currently being played, being identical in use to game credits either bought or otherwise won by the player. In some gaming machines the bonus award is not additional game play but rather a multiplier on a cash prize the player has already won on the primary game. Bonus prizes have also been implemented as a single "jackpot" type where the prize may be a single large monetary prize or significant non-monetary prize such as a car.

An improvement over simple bonus additions to gaming devices is the bonus implementation known as "investment bonus". An example of this type of game is the 1937 Mills "Bonus Bell" game which provides a primary slot reel game, and a secondary investment bonus game (or "come-on" feature). During regular play the word "BONUS" could be spelled out by hitting the correct letters in sequence on the first reel for an eighteen (18) coin award. This type of game is generally referred to as an "investment bonus" game because the player invests in continued play of the same machine to achieve the requirements for the bonus award (e.g., in the Mills' game completing the word "BONUS"). If the player were to terminate play of the investment game prior to completing the requirements for the bonus award (e.g., the player only completes "BON"), the player normally forfeits the player's prior investments ("BON") and must later fulfill the requirements anew. Furthermore, a subsequent player may "take over" a previous player's investment by commencing play of the investment bonus game after the previous player vacates the machine.

A recent development, made possible with the use of gaming machines that are electronically coupled, are progressive awards. Progressive awards are normally cash awards or prizes, and typically comprising a large jackpot amount. Progressive awards are funded by coupling more than one gaming machine, where a percentage of the money a player spends at each gaming machine goes into a central award or "pot". The players of each coupled machine compete for the progressive award. The overall result, due to the multiplicity of players feeding into the progressive pot, is that a significantly larger award results. Each player playing a machine coupled to the progressive can win the progressive at the individual machine being played. Some gaming machines further allow the player to elect to participate in a progressive or not, the eligibility criteria typically being that a player is required ("elects") to bet using a certain minimum amount or makes bets using a "max bet" selection. Upon the occurrence of a specific game result, the progressive pot or award is issued to the player. Since the progressive award is normally large, it acts as an additional incentive for players to play gaming machines that form a part of an on-going progressive.

Current gaming devices and methods, while suitable for normal award credit payout and one-time non-monetary prize payout, have some particular disadvantages. First, current gaming schemes do not support awarding prizes having any type of complex interrelationship which require a player to collect multiple "winning events" towards the redemption of an award, other than simple credit accumulation. This is especially true where the winning events may be derived from two or more gaming machines. Current systems do not allow a player to collect the player's game points on one machine for usage on a secondary machine for further collection of points toward prize redemption. Nor do current systems provide the collection of points on one machine for redemption of awards on another machine or a central (or separate) prize station. Current systems also fail to provide for collection of points on one machine for later aggregation with the same machine during subsequent play.

Thus, there is a need for a method and apparatus to enable players using gaming devices to be awarded prizes having a complex interrelationship with the requirements for winning a next level of prize made up of smaller prizes, including multiple game device and multiple session accumulation, where the awards or prizes are not the traditional comps based on player tracking nor are they simply an accumulation of fungible credits or tickets.

BRIEF DESCRIPTION OF THE INVENTION

The present invention provides for method and apparatus to save award states in the form of components of a specified prize, or portions of components to a specific prize. The prizes are in the form of some tangible item (i.e., a motorcycle, a painting, a picture, a sculpture), and the gaming machines are configured, in one preferred embodiment, to give a player a choice of playing for the prize item or regular game credits. If the player chooses to play for the prize item, the gaming device is configured to award components, parts of the components, or points that comprise part of the total needed for a component.

The player must collect the entire prize, as represented by the pictorial or symbolic representation given to the player by the gaming device upon a winning event. Once the player has the entire prize in symbolic form, the player wins the prize. More details on the different ways of winning all the components needed are given below. The pictorial or symbolic representations are a form of user-friendly (player-friendly) savable game state, specifically the portion of savable game state having to do with awards and/or prizes. This form of award state allows a casino to design prize winning combinations that cater to all levels of spenders (including very low stakes players, who are normally excluded from playing for significant prizes or awards) and to encourage or require the play of different gaming devices over a long period of time. This has the effect of encouraging repeat player visits, encouraging player experimentation of new or different games, and enables the winning of cumulative, significant prizes without requiring a player to have any form of traditional player ID (be on the casino's player tracking database). In addition, the present invention may be fully integrated into player tracking databases if the player and/or the casino chooses.

The present invention further includes the means and apparatus to make using this form of savable game state as easy as possible for a player, and as easy as possible to include in establishments having pre-existing game devices that have limited output means (typically some kind of voucher or ticket printer). This is accomplished by having the ability to issue specially designated or encoded tickets, vouchers, magnetic strip card data, etc., from the gaming device, which are then used with a kiosk, designated terminal, or other game machine which can give the player prize-specific and pictorial (human readable) versions of the non-human readable forms of savable game state. The player can then work with the pictorial version of the components of the prize, including the ability to combine or store multiple savable game state vouchers or tickets into one human-transportable item or save them, anonymously or with a traditional player's ID, on a backend database.

The present invention also works in jurisdictions where gaming is restricted to lottery-based play, where a game result is selected from a fixed pool of outcomes, rather than from a randomly generated event. One preferred embodiment is the winning of components from the primary lottery game that cannot be redeemed directly or individually, but rather in toto both form a representation of a prize and, if all the needed components are possessed by a single player, is a winning event. Another preferred embodiment has winning components to a prize implemented as a special bonus or secondary game, run off of the primary game where the player either gains entry by having a special indicia on a primary game card or event and is then presented with a bonus or secondary game card or event which will have, according to the fixed pool, its own chances of getting various components to the overall prize.

DETAILED DESCRIPTION OF THE PREFERRED EMBODIMENTS

Figure 1:
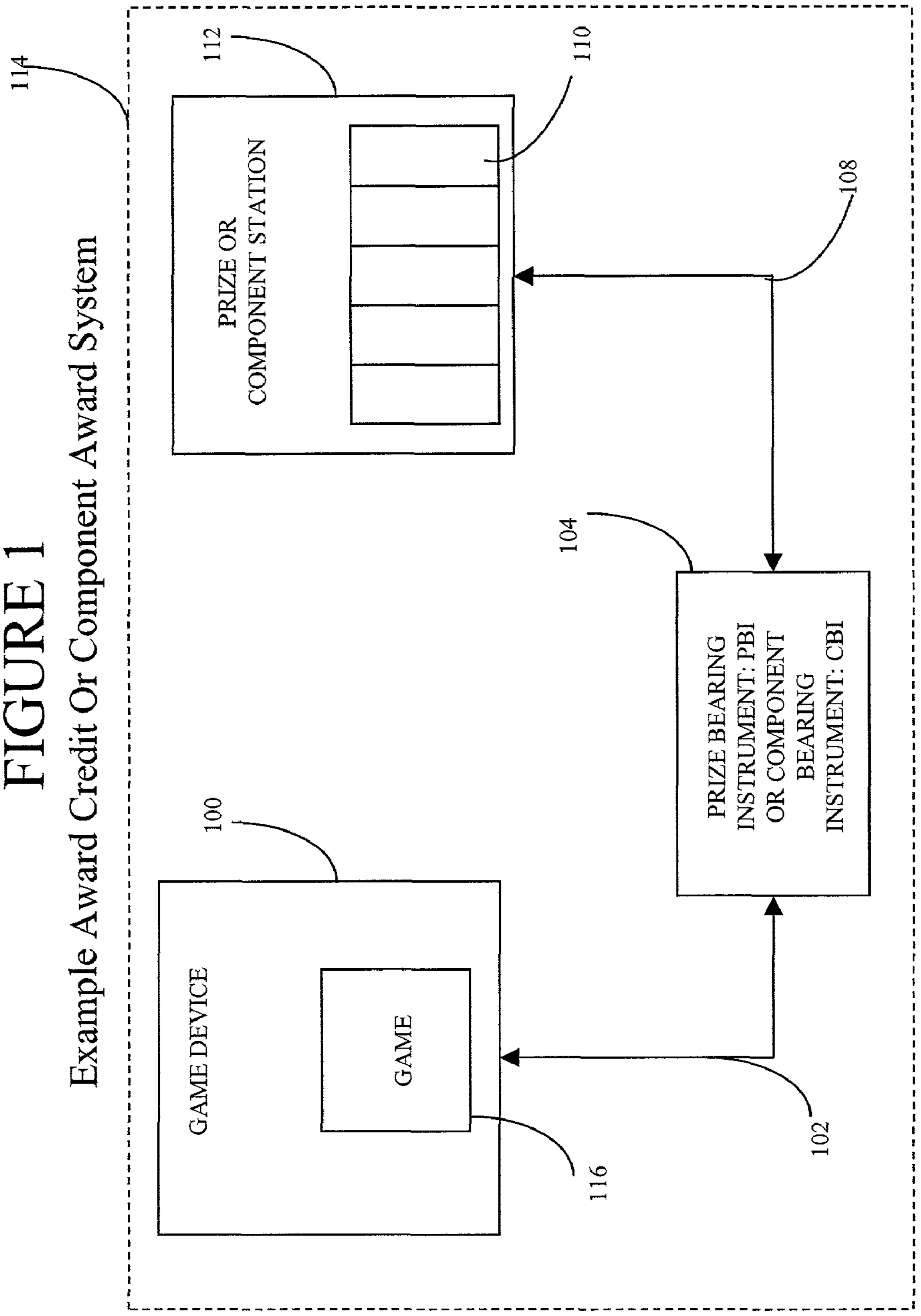
FIG. 1 is a functional block diagram of an example system for using award game states or component prizes in accordance with the present invention.

Persons of ordinary skill in the art will realize that the following description of the present invention is illustrative only and not in any way limiting. Other embodiments of the invention will readily suggest themselves to such skilled persons having the benefit of this disclosure.

Referring to the drawings, for illustrative purposes the present invention is shown embodied in FIG. 1 through FIG. 16. It will be appreciated that the apparatus may vary as to configuration and as to details of the parts, and that the method may vary as to details and the order of the acts, without departing from the inventive concepts disclosed herein.

Figure 14:
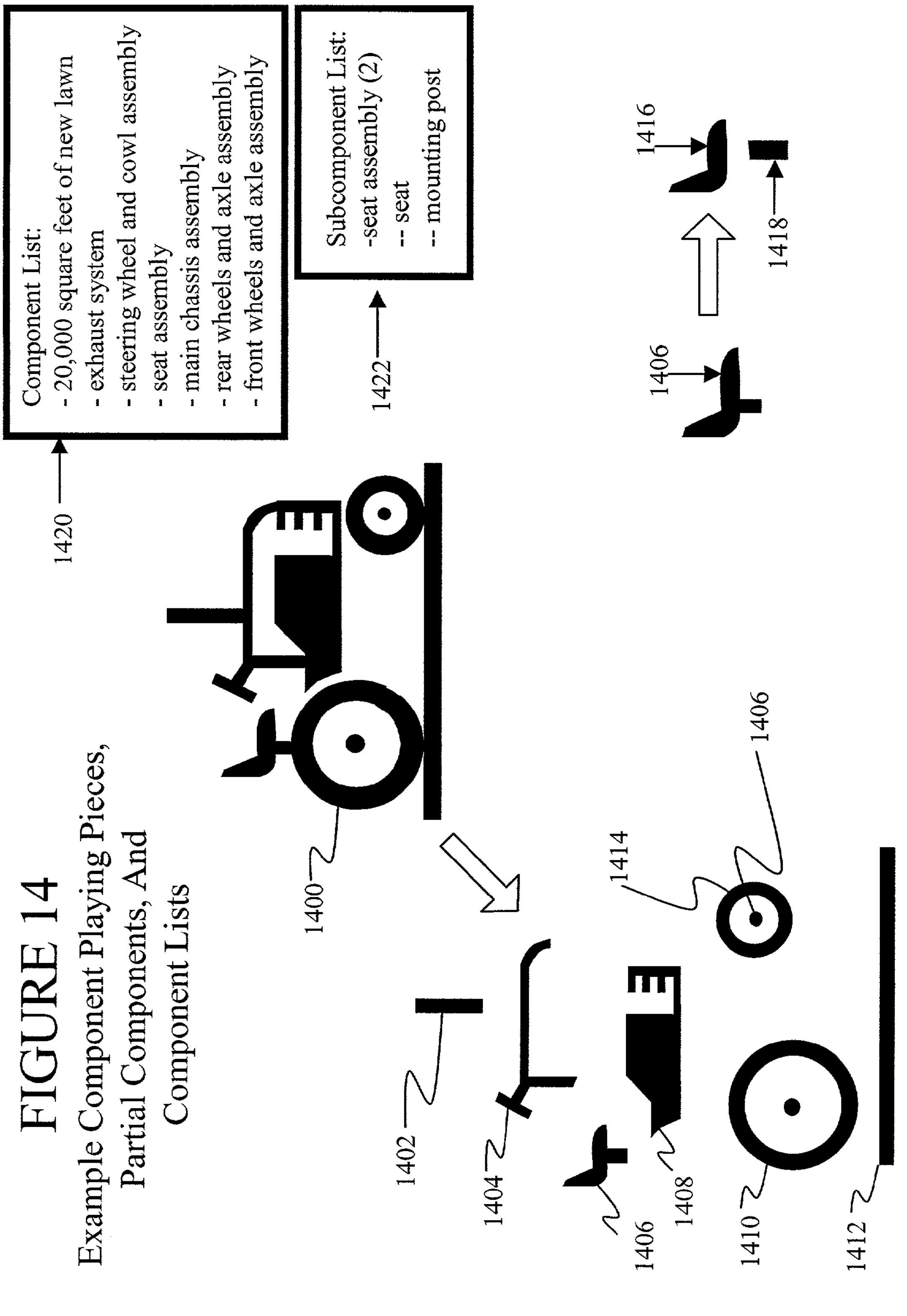
FIG. 14 is a block diagram showing one example of component awards according to the present invention

Referring first to FIG. 14, an example of a component game made up of individual component awards, where the individual awards may correspond to award game states, is shown. Component games start as a pictorial representation (alternatively, a list of specified elements) of the actual physical item which is the prize. In this case, a garden tractor on a lawn. In a preferred embodiments, the pictures will be far more detailed, graphically correct, comprising far more individual components; FIG. 14 is a simplified graphical representation for illustrative purposes. In FIG. 14 the grand prize is a garden tractor and a newly planted lawn, including a layer of top soil and reseeding as needed, up to a specified area (up to 20,000 sq ft). The component game, illustrated as 1400, is broken down into component parts, individually winnable component awards, or simply components (understood to be individually winnable) are shown as 1402 through 1414. The selection of winnable components is made by the people determining the overall value of the prize coupled with the target prize "use" in a gaming environment. "Use" considerations include but are not limited to the number of game and gaming devices that will be involved in the particular component game, the time period over which the game is targeted to be in use (i.e., how long before the prize is won), the target audience, the target play amounts (i.e., will only players using a specified minimum bet amount be allowed to win components), game and gaming device configurations, etc.

The present invention is extraordinarily flexible in allowing a casino to use an almost inexhaustible combination of parameters to encourage players at all playing levels to partake in a component game. It is also intended that any one casino will have several component games running concurrently, with some component games having a relatively small number of components (such as FIG. 14), a relatively small value, and further being enabled to allow multiple players to collect all the components so as to generate on-going excitement, especially amongst players who typically make small individual bets, while others will have perhaps on the order of a hundred components, with the component game being valued at least in the tens of thousands of dollars and running for an extended period of time.

Returning to FIG. 14, The component parts in this illustration consist of exhaust system 1402, steering wheel and cowl assembly 1404, seat assembly 1406, main chassis assembly 1408, rear wheels and axle assembly 1410, front wheels and axle assembly 1414, and newly planted lawn assembly 1412. In addition, one component is broken down into two subcomponents; seat assembly 1406 is broken down into subcomponents consisting of a seat 1416 and a seat post 1418. This enables casinos to assign different levels of prizes depending on the amounts being played by individual players. Higher stakes players are eligible to win the seat assembly, while lower stakes players are eligible to win seat subcomponents.

In one preferred embodiment, each component or subcomponent has to be won by itself, that is, during individual game play. The casino has the freedom to group participating games so that, as an example, there are seven sets of game machines or devices, and a player has to achieve at least one winning event (getting one component thereby) from each of the seven groups. This encourages diversity of game play. Alternatively, a casino may designate certain times as the only time when participating game devices will award certain components. One example would be making Mondays and Tuesdays (typically slower days than other days in a casino) "wheel" days. To win components 1410 and 1414, a player must play a designated machine, set of machines, or perhaps any machine in the casino, and achieve a winning event on a Monday or a Tuesday. Alternatively, play may be time constrained; mornings between 7 AM and noon are designated as "wheel times", and to win the two wheel components a player must achieve a winning event on one of the participating game machines during those times.

In addition to making use of component prizes to encourage both multiple and varied game device play, as well as encourage time and day specific play, the present invention also allows a casino to involve players at all betting levels. Using the present example, a casino may choose to allow a player to win the entire seat assembly when making "max bet" plays, and enable players making less than max bets per play to enjoy the possibility of winning seat subcomponents. In addition to setting the odds of wining a subcomponent appropriately for the money being spent by a player, this allows a casino to encourage play amongst the lowest betting players on a floor. These "penny players" are often left out of progressives and other high stakes awards, which discourages play. With the present invention a cautious player may still win subcomponents in one of the component games being run by a casino, and thereby be encouraged, over time, to participate at higher levels and with more frequency. In all cases more play is encouraged at all levels than was previously reasonably possible, due to the configurability of the component games themselves.

These examples are not any where near exhaustive; a person of ordinary skill in the art and with the benefit of the present disclosure will be able to arrive at numerous ways and combinations of using component prizes in conjunction with multiple machines, times, days, or other events, in any combination. The basic property of component prizes is that they greatly encourage continued play and enable extreme flexibility in how the prize may be awarded using components. How the encouraged play is made use of at any particular casino is highly configurable, using time (minutes, hours, days, months, recurring time periods, etc.) and game devices (using sub-groups of the machines enabled for component prizes), by that casino; this is in itself a remarkable property of the present invention.

Continuing on with FIG. 14, also shown is a component list 1420 and a subcomponent list 1422. The component list is a text representation of the components, listing each required component and subcomponent (in the subcomponent list). This alternative form may be used when limitations exist with older gaming devices having limited printing means. If a player wins a component and is issued a ticket or voucher having, in part, a text format, in a preferred embodiment the player would then take the ticket or voucher and exchange it for a graphical representation at a component station (described more fully below). This is not required; a player may choose to keep the textual format ticket or voucher and may still win the component game prize by winning each component, in whatever form it is stored, printed, or saved (included a purely numeric or other non-human readable representation inside a machine readable storage device).

However, much visual excitement is lost when a pictorial representation is not used, so a preferred embodiment will make use of pictorial representations of all components. This preferred embodiment will further configure the components such that when a player has a complete set of components, the components fit together to form a picture of the prize or graphical representation of the prize.

In one embodiment which uses limited printing means on existing game devices, a player may collect and win a prize by collecting a textual description of each component. Alternatively, a player may win by collecting (winning) each component which is them stored in any manner, including but not limited to tickets or vouchers that only have bar codes or other machine-readable-only data on them, purely electronic representations kept in any type of backend database where the data is associated with an individual through an anonymous player identifier (discussed below), a traditional player's ID, or by keeping electronic representations of the components in a hand-held device that can interface with the game device and/or component service station (i.e., a Palm Pilot™ with a program downloaded into it, designed to use the IR interface that exists in the Palm Pilot™ and to further use the IR interface to operably communicate with at least one system in the casino).

Referring now to FIG. 1, a block diagram of an example system for use with a player's award credit state, and also a players component game state, is shown. System 114 includes a game device 100 and a prize or component station 112. Game device 100 comprises a conventional game of chance, such as a slot machine, video poker machine, video lottery device, keno machine, bingo machine. The game device 100 may alternatively comprise a live table game of chance, such as a blackjack table or roulette table, where the functions described herein carried out by the gaming device are carried out by a table attendant.

If game device 100 is not a live table game, then game device 100 further provides a game 116 configured for play by a player. Game device 100 would then include typical hardware and software components (not shown), such as a processor, memory, and input/output devices such as a video output or rotating reels, control inputs, and game software for executing game 116. According to play of the game 116, one or more game results may provide the player with an "award credit". The game results may be provided by a game of chance involving random events or may be provided from a predetermined outcome selected from a fixed pool (e.g., a lottery).

Award credits, unlike game credits which are used for playing the game 100, may be directly redeemed for prizes or awards on prize station 112. Award credits may also be used in a meta-game. Although in the preferred embodiment award credits are not used for additional game play, the present invention fully encompasses embodiments which do provide for award credits being used to add to game play credits.

A meta-game is defined as using credits, award credits, promotional credits (defined below), or any other transferable result(s) from one or more individual games comprising a plurality of individual game units, towards a game that requires, in order to play, the output results (in terms of credits, award credits, promotional credits, special indicia, etc.) of previously played game or games, and where the meta-game is a different game than any of the games from which output results are being used.

In the simplest case (other than straight prize redemption using award credits) the award credits may comprise meta-game pieces which are collected by the player for use at prize station 112. In this example, the meta-game pieces may be part of a game board or puzzle and when the player has collected a particular subset (i.e., collection or accumulation) of meta-game pieces, the player uses those pieces with prize station 112, where the combination of award credits will entitle the player to a particular prize or class of prizes. In other cases the award credits may entitle the player entry into a more complex meta-game, where the award credits are used in the meta-game in a similar way that currency is used in primary games.

Figure 2:
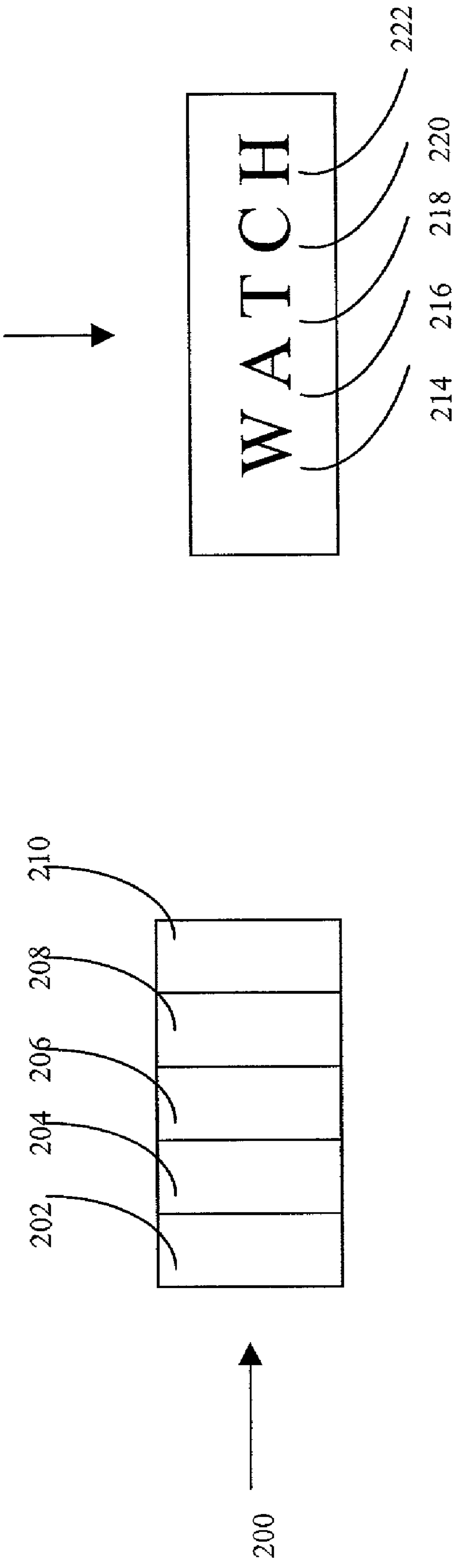
FIG. 2 is a functional block diagram of an example game board suitable for use with the present invention.

FIG. 2 illustrates a sample game board 200 having spaces for game pieces 202, 204, 206, 208 and 210. The game pieces 202 through 210 may be represented by indicia or representation to a particular theme, such as a popular board game, television show, movie, etc. Game rules may require accumulation of all or part of the game pieces 202 through 210 for different levels of prize awards.

FIG. 2 also illustrations a second sample game board 212 having letter space holders to accommodate letters 214, 216, 218, 220 and 222 corresponding to the word "WATCH". This game allows a player to collect letters (game pieces) from the word "WATCH" during game play of the primary game, normally a slot game. Once the player has collected all the letters, the player may redeem a prize corresponding to "WATCH" from the prize station. Numerous other game board formats and rules suitable for use with the present invention will be readily apparent to one of ordinary skill in the art and with the benefit of the present disclosure.

Referring back to FIG. 1, according to one aspect of the invention the game device 100 is configured to maintain a record of the accumulated award credits (game pieces) associated with the player, including award credits earned during play of the game 116. Alternatively, game device 100 is configured to keep track of events that may result in the awarding of a component directly, or events that may be accumulated until enough points (or other game achievement) is reached, which only then results in the awarding of a component. These accumulations of events may be implemented in the same way as player award credits, with a Component Manager keeping track of correlations between accumulated events and components. The player may maintain the player's state of award credits earnings (also called award credit game state, award credit state, or for component games component game state) even when the player has terminated play of the game device 100.

In one embodiment, the player's game state is maintained via a prize bearing instrument (PBI) 104. PBI 104 may comprise any media suitable for associating a player's award credits with the player. Example media include a printed ticket (voucher), a magnetic or smart card, or other information storage medium. As an interface to PBI 104, game device 100 provides a PBI reader/writer device (not shown) capable of reading PBI 104 and writing to (or generating) a PBI. PBI 104 will typically contain one or more data records indicating the number of (or collection of) award credits earned by the player. For vouchers, game device 100 will include a voucher reader and a voucher printer that is in operable communication with game device 100. When the player selects to terminate play, game device 100 prints a voucher indicating the number of award credits earned by the player. If the player is playing at a gaming device that is enabled for component game play, the component game state may be kept on a component bearing instrument (CBI) rather than a PBI. The CBI will have information on the components a player has won, or, credits that may be applied to a component after more are won during game play.

Game device 100 is also configured to determine the accumulated award credits previously earned by the player, generally by reading PBI 104 as presented by the player and identifying any award credits indicated. The previous award credits may have been earned from the same game device 100 or a similar gaming device having the same underlying feature set of game device 100. If the game devices are component game enabled, 104 will be a CBI, with component game state being saved in the CBI.

The award credits previously earned as identified by game device 100 are accumulated with further award credits which the player may earn during current play of game device 100. The accumulated award credits may be maintained by the player at the termination of play of the game device 100 via another PBI 104 which indicates the overall accumulated award credits earned. PBI 104 thus preserves the award credit game state of the player in terms of award credits upon termination of play on the gaming device. The player may later resume play of the game device 100 at the preserved game state by presenting PBI 104 to game device 100 as described above. The same applies of 104 is a CBI, with the player either having won one or more components or building credits that may result in the awarding or winning of a component.

In the example "WATCH" game 212 of FIG. 2, the player retains the player's earned letters (investment) so that when the player later continues play either on the same or different game, the player's letters (investment) is retained and restored and the player resumes play from the preserved award credit game state. Although described herein for the purposes of redeeming tangible prizes and service, it will be readily apparent to those skilled in the art and with the benefit of the present disclosure that the present invention is suitable for preserving award credit game state with bonus games, progressive games, and investment bonus games, among others.

Continuing with FIG. 1, prize station 112 contains one or more prizes 110. The prizes may be tangible goods (e.g., diamonds, keys to a car, event tickets), services, or monetary awards. Although not required for operation of the invention, the prizes are not generally redeemable directly via cash payments by the player to the prize station or the game devices. Rather the prizes are normally redeemable via award credits earned by the player from playing game device 100. The redemption process indicated by double-headed arrow 108 is manually initiated by a player, as is the playing process indicated by double-headed arrow 102. Both paths make use of PBI 104. Redemption path 108 is executed by presenting one or more PBIs to prize station 112. Prize station 112 is equipped with a PBI reader/writer device (not shown) for reading PBI 104 and determining the award credits associated with the player from data provided by PBI 104. The prize station then determines the prizes to which the player is entitled according to the award credits earned by the player. For example, prizes may be selected according to the number of award credits earned (e.g., using a hierarchical prize level arrangement) or according to the collection of types of award credits earned (e.g., game pieces on a game board or puzzle) or both. Other prize payout arrangements may also be used.

After the player's selection, the selected prize is awarded to the player. According to one embodiment of the invention, the prizes are maintained in vaults having doors secured by latches and windows to thereby allow the player to see the prizes inside the vaults and yet provided a level of security by limiting access to the prize. Further descriptions of physical access controls, methods of prize delivery, and alternative prize presentation methods may be found in co-pending parent application having Ser. No. 09/788,168 and co-pending parent application having Ser. No. 09/742,679, both of which are fully incorporated in this application by explicit reference.

Alternatively, 104 may be a Component Bearing Instrument (CBI) rather than a PBI. The difference between the two is that a PBI saves award credit game state, which is usable in many ways. A CBI is usable only for playing (use with) a component game, so a CBI saves component game state. If 104 is a CBI, then 112 is a Component Station in addition to (or instead of) a Prize Station. Component Stations have installed in them a Component Manager, which can either combine a plurality of CBIs a player may accumulate, or in one preferred embodiment will exchange text or non-human readable CBIs for high quality pictorial representation of any components the player was already won, enabling the player to work towards completing a graphical picture of the component prize rather than merely collecting vouchers or tickets.

Figure 3:
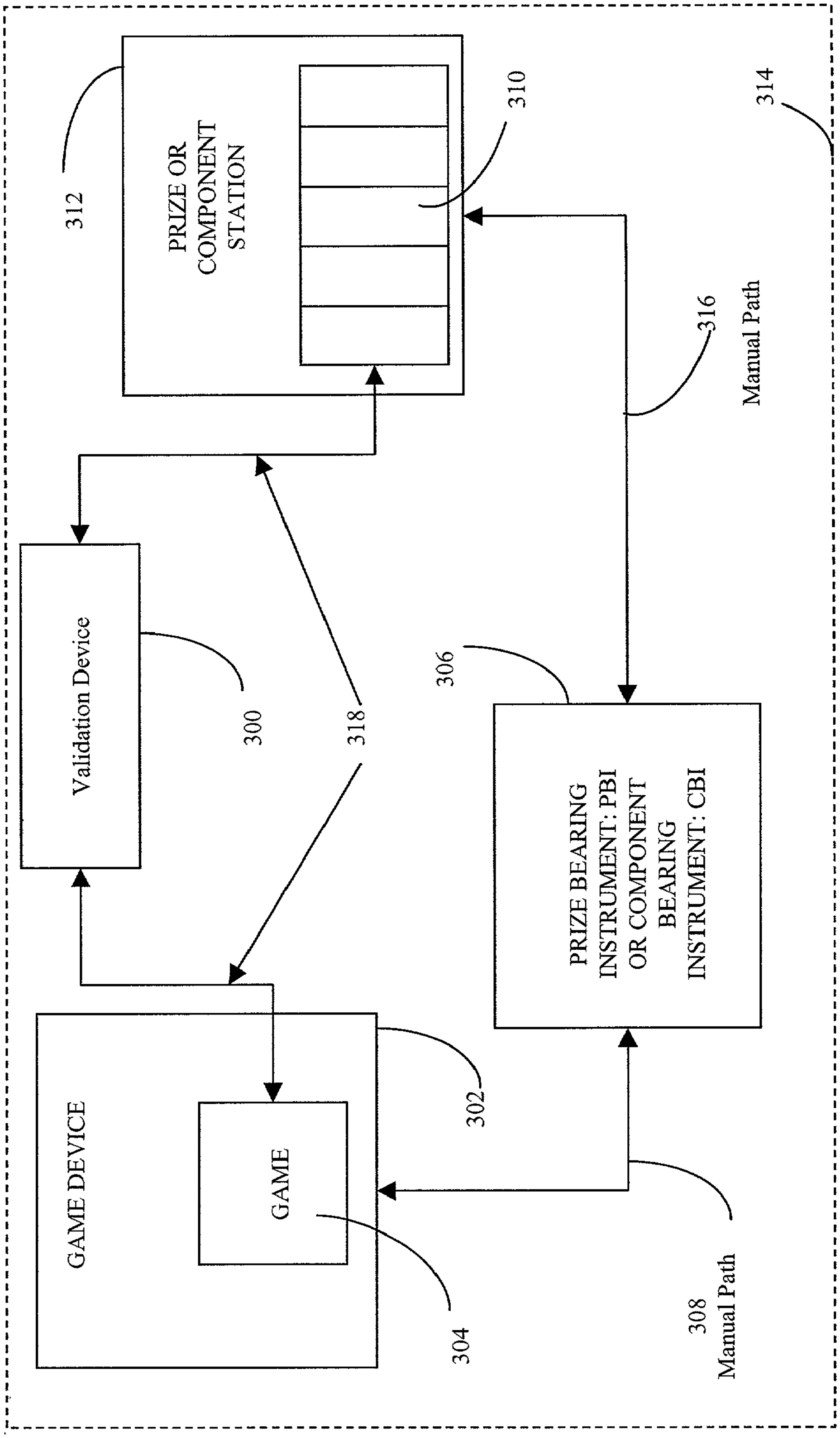
FIG. 3 is a functional block diagram of an example system for maintaining and using award game states or component game states in accordance with the present invention.

Referring now to FIG. 3, another embodiment of a system for maintaining a player's Award Credit Game State (ACGS) in accordance with the present invention is shown. System 314, like system 114 described above in conjunction with FIG. 1, comprises a game device 302 for playing a game 304 and a prize station 312 comprising one or more prizes 310. System 314 further comprises a validation device 300 which typically comprises a server computer configured with conventional hardware and software components (not shown). Validation device 300 is operatively coupled for communication with game device 302 and prize station 312, normally via a network connection, shown as connections 318.

Validation device 300 may function in one of a number of ways. According to one aspect of the present invention, validation device 300 may serve to validate ACGS which is earned and collected by the player on game device 302 and redeemed for prizes at prize station 312. Various validation means known in the art may be used to carry this out, including maintaining transaction records on validation device 300 which corresponds to transaction records identified on the player's PBI 306.

According to another aspect of the invention, the use of validation device 300 eliminates (or reduces) the need for recording the actual ACGS onto PBI 306. Rather, validation device 300 may serve to maintain the ACGS associated with players in a database (not shown). Under this arrangement, the player is identified with a record in the database, which further identifies the award credits earned by the player. The player may use any means for identifying herself to game device 302 or prize station 312, including using a personal identification number (PIN) or using an identity PBI 306, which instead of bearing the award credits earned by the player provides a unique identifying information to identify the player's corresponding ACGS information. The use of PBI 306 is indicated by double-headed arrows 308 and 316; both show a manual path of use by the bearer of the PBI. In each case the bearer of PBI 306 would insert it into a PBI reader at the target location.

The same functional relationship exists when 312 is configured as a Component Station rather than a Prize Station, and 306 is a Component Bearing Instrument (CBI) rather than a Prize Bearing Instrument (PBI). By using a Validation Device, the CBIs may either be verified or may make use of the Validation Device to keep some portion of the component game state data on it, rather than keeping all the component game state data exclusively on the CBI. Component game state data may include, but is not limited to, individual game device identity (the game device on which a component or subcomponent was won, or an accounting of partial award states that may be accumulated to eventually win a component), components won, components partially won, subcomponents won, any transferable component award state that has not yet resulted in the winning of a component or subcomponent, player data (amount bet, amount of time spent, etc., if the player was not using a player's ID nor an anonymous player ID), time and date information stamp, and any facilities information (location). Component game state data is also referenced generally as component data, where component data includes any and all information associated with component game state data, in addition to additional or unique representations of the data that is not necessarily tied to any form of game state as that term is used herein.

Figure 4:
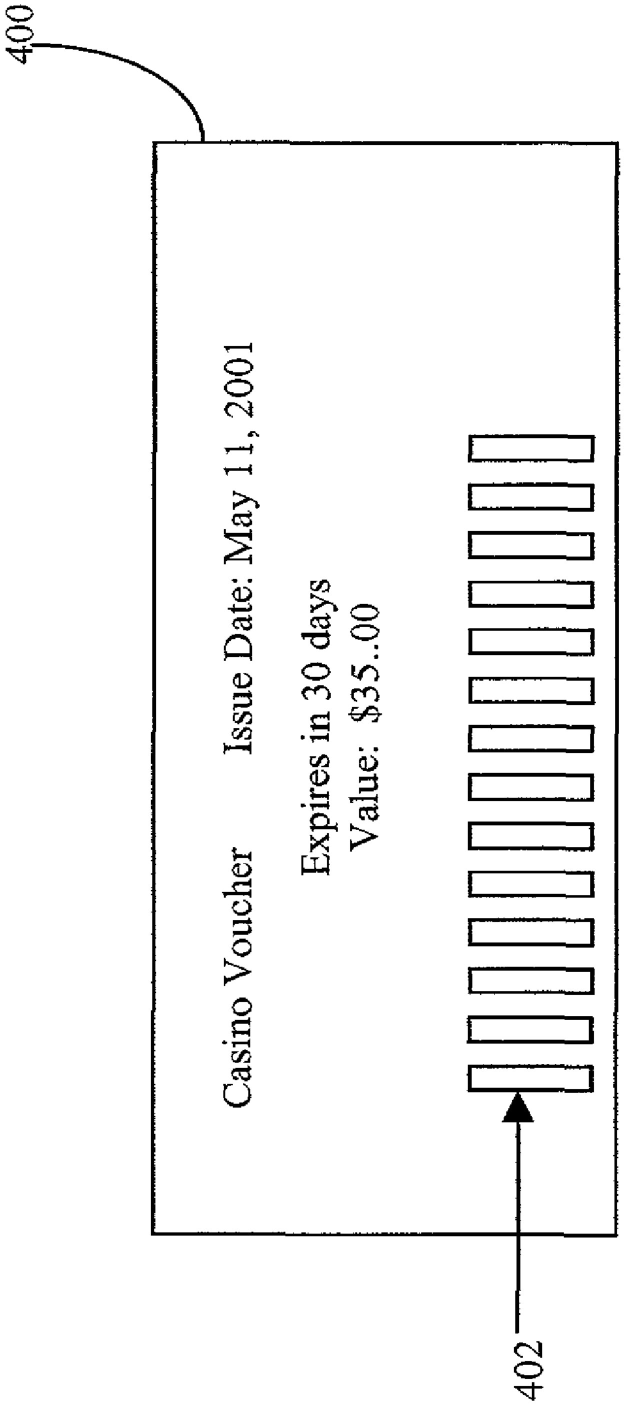
FIG. 4 depicts a sample voucher ticket suitable for use with the present invention.

FIG. 4 depicts an example ticket voucher 400. Ticket voucher 400 includes a data record in the form of a UPC bar code 402. As described above in conjunction with FIG. 3, this data record may identify the player's award credits, component game state, or may alternatively identify the player's corresponding record in the validation unit's database.

Figure 5:
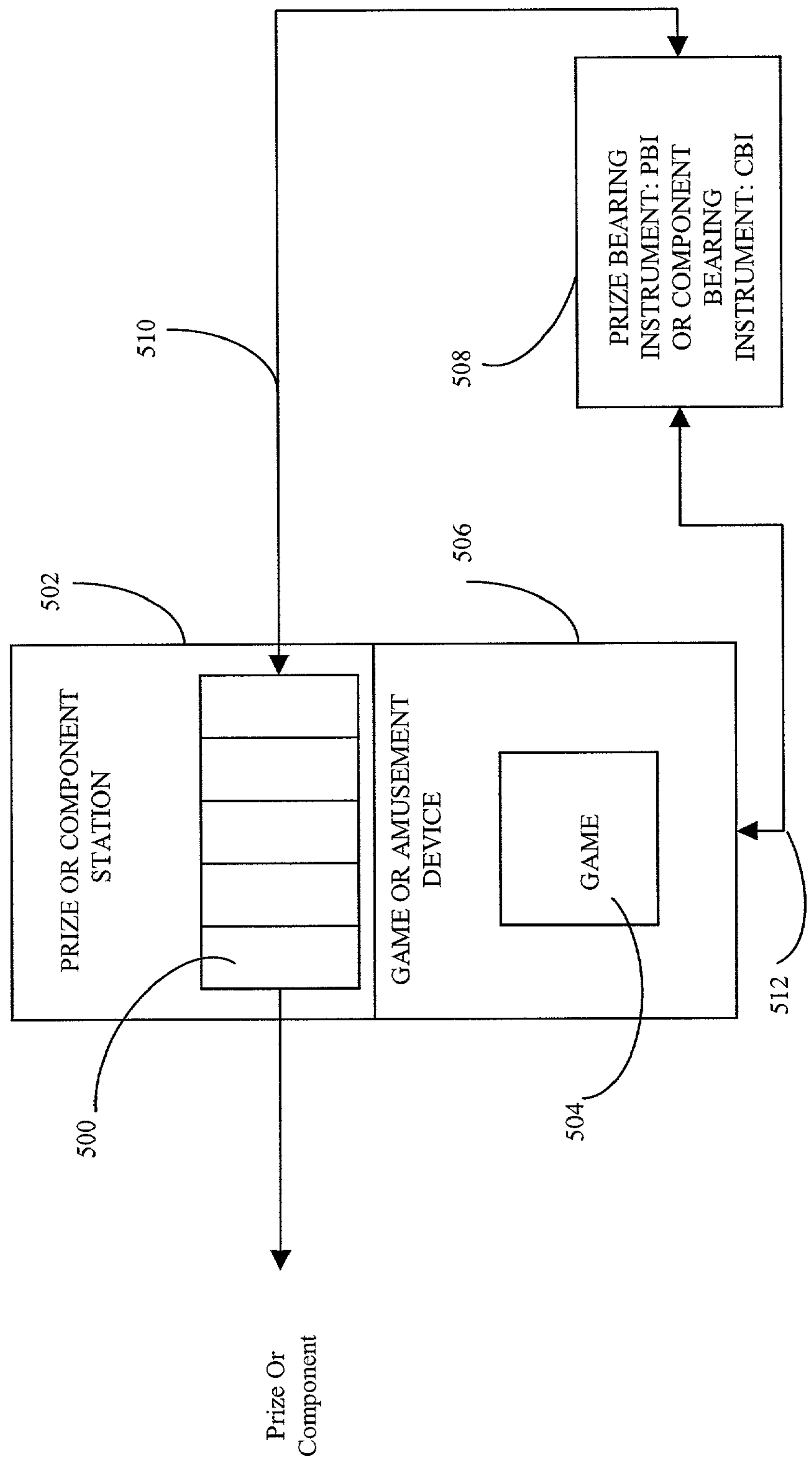
FIG. 5 is a functional block diagram of another example system for maintaining and using award game states or component game states in accordance with the present invention.

FIG. 5 illustrates another example embodiment of a system for maintaining a player's game state in accordance with the present invention. The system has a game device 506 suitable for playing a game 504 and a prize station 502 having one or more prizes 500. Game device 506 and prize station 502 are integrated into a single unit.

Game device 506 and prize station 502 may further be operatively coupled for communication to allow prize redemption to be made by the player via the game device. In this embodiment, the game device may include a monitor or other display device (not shown) for displaying game play as well as prize selection on a single display unit. A gaming device may further be coupled to or configured to be coupled to a network for connection to the global information network (Internet). Under this arrangement, a web-based scheme may be used to provide prize selection and to select delivery method directly on the gaming device, and in one preferred embodiment the web-based nature of the prizes being presented would be invisible to the user. In this environment, the player's award credits (AWGC) may be used for shopping online, and in one preferred embodiment the selections are from a pre-selected group of cooperating merchants, with pre-selected merchandise. PBI 508 may also be used as described above in FIG. 1 and FIG. 3. Path 512 shows manual use of PBI 508 with the player inserting/withdrawing PBI 508 from game device 506. Path 510 may be either a manual path, where the player inserts PBI 508 into a reader associated with prize station 502, or may include an electronic connection between game device 506 and prize station 502, where PBI 508 may be issued after completing a transaction at both game device 506 and prize station 502.

A similar functional relationship exists when 502 is configured as a Component Station rather than a Prize Station, and 508 is a Component Bearing Instrument (CBI) rather than a Prize Bearing Instrument (PBI). In such cases the component station will have the ability to award pictorial components the player has won by either printing them on a high quality printer, or by issuing a pre-printed component award card having a picture of the component the player just won, allowing the player to use the issued component awards like pieces of a jigsaw puzzle. In addition, the component station will be able to read multiple component game state vouchers (CBIs) and will, under the rules of the applicable component game, combine certain states and issue components accordingly.

Figure 6:
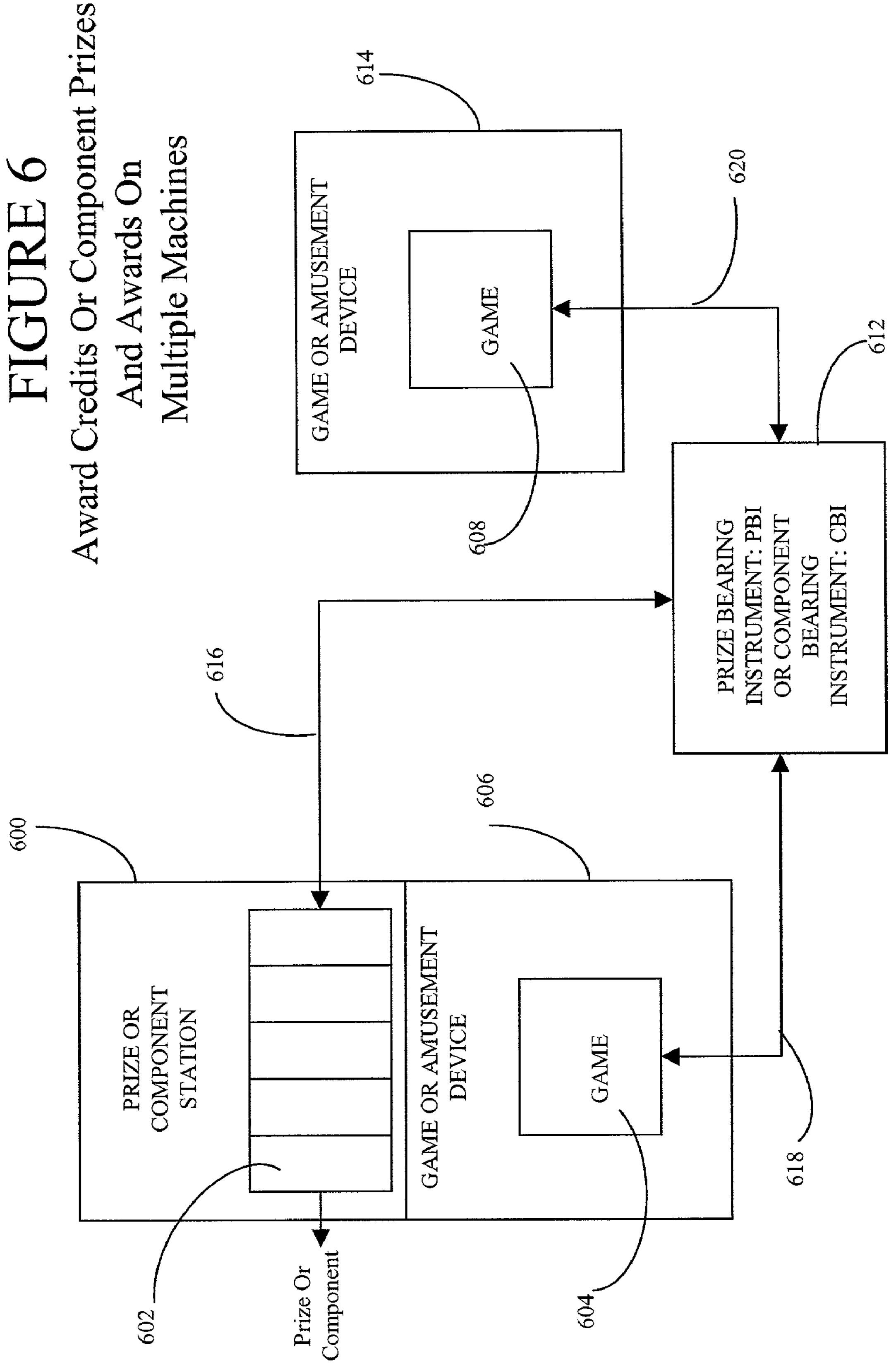
FIG. 6 is a functional block diagram of another example system for maintaining and using award game states or component game states and component prizes in accordance with the present invention.

Referring next to FIG. 6, shown is another example embodiment of the present invention for maintaining a player's award game state. There is a game device 606 having a game 604 for play and another game device 614 having a game 608 for play. The game device 606 is integrated with a prize station 600 as described above in conjunction with FIG. 5.

The award credits earned by a player on game device 606 may be maintained and later presented and accumulated with additional award credits on game device 606 or game device 614, normally via PBI 612, although as noted above a validation unit may be used to perform this game state maintenance function on the "back-end". Likewise, award credits earned by a player on game device 606 may be maintained via PBI 612 for presentation and accumulation of further award credits on game device 614 or game device 606. PBI 612 may be presented to the prize station 600 for prizes shown generally as 602. Paths 616, 618, and 620 show the different uses to which PBI 612 may be used in this embodiment. Paths 618 and 620 are award credit creation/gathering by manually using (or receiving) PBI 612 from game devices 606 and/or 614. Path 616 indicates the manual use or retrieval of PBI 612 after using prize station 600. A similar functional relationship exists when 600 is configured as a Component Station rather than a Prize Station, and 612 is a CBI rather than a PBI.

Figure 7:
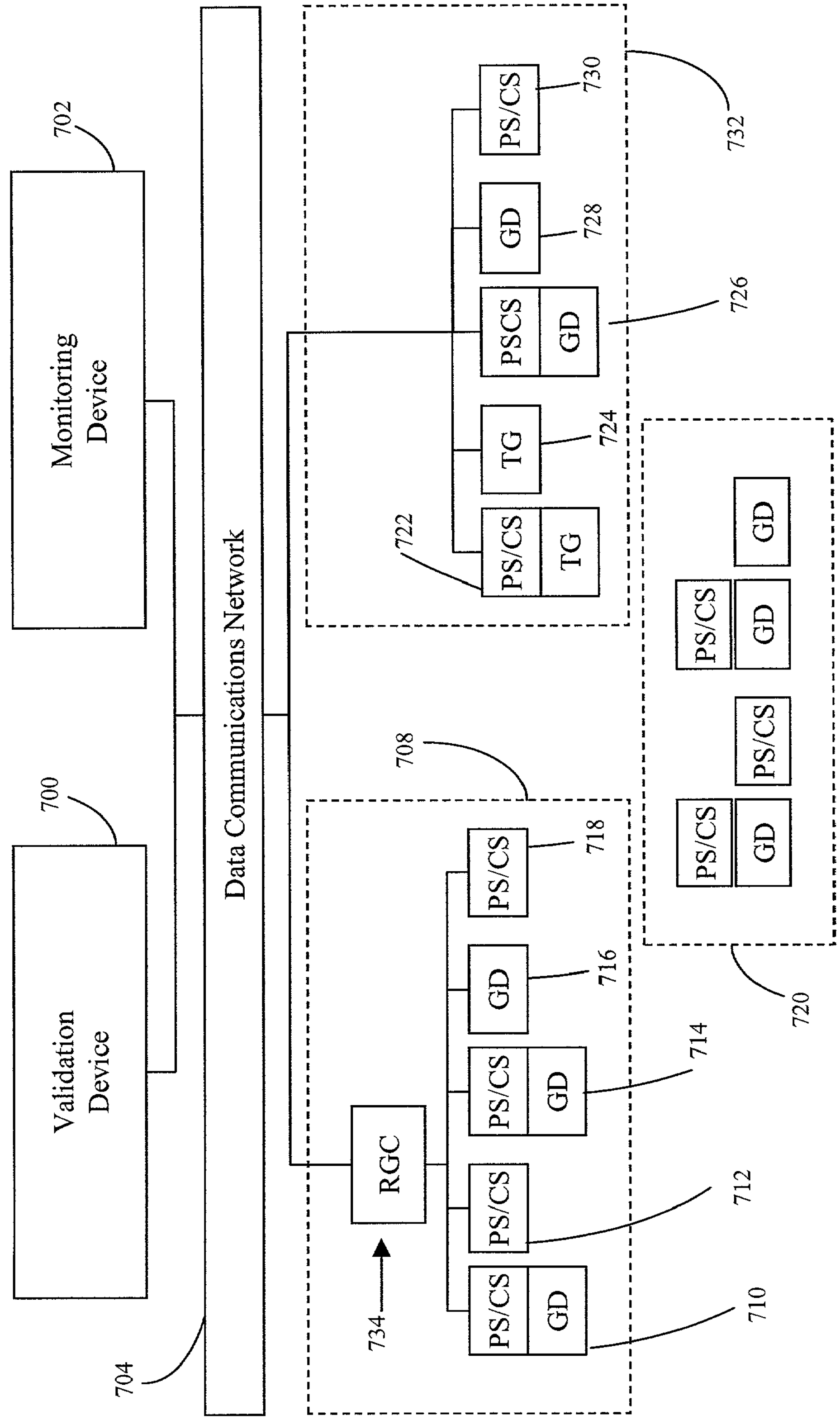
FIG. 7 is a functional block diagram of a more complex system for using all game states in accordance with the present invention

Turning now to FIG. 7, there is shown another example award state maintenance system which comprises a plurality of individual systems grouped as 708, 720, and 732. FIG. 7 illustrates that a wide variety of systems and subsystems may be utilized with the present invention. Subsystems include those that are both connected and unconnected.

Systems 708 and 732 are each operatively coupled for communication to a validation device 700 and a monitoring device 702 via a data communications network 704. System 708 comprises a plurality of game devices and prize stations each coupled to a conventional remote game controller (RGC) 734. RGC 734 is coupled to communication network 704 for communication with the validation and monitoring units. System 708 includes individual game device 716 and prize stations or component stations 712 and 718. System 708 further includes integrated game devices and prize/component stations 710 and 714. Award credits earned in any of the gaming devices may be maintained according to the present invention, including a PBI (alternatively a CBI), validation unit 700, or via a combination of the PBI (or CBI) and the validation unit 700 as described above. The present invention encompasses configurations that allow system 708 to issue award credits and/or component awards that may or may not be used on system 732 or on system 720; any subsystem may be configured to accept or reject award credits and/or component awards from other subsystems, depending on the needs of the particular installation.

System 732, comprises a plurality of game devices and prize stations coupled directly to communication network 704. The game devices of system 732 include table games (TG) 722 and 724 as well as conventional game devices 726 (with integrated prize/component station) and 728 and a non-integrated prize/component station 730. Table games 722 and 724 are maintained by an attendant or dealer for the particular table game (e.g., blackjack, roulette). Each table game is also equipped with a PBI and/or CBI reader/writer (not shown) to enable a player of the table game to present her PBI/CBI and establish the player's existing or previously earned award credits. Certain game results (such as consecutive blackjacks) may result in further award credits or component awards earned by the player during play of the table game. At the completion of play the PBI/CBI reader/writer may be activated to generate a PBI and/or CBI to give to the player after play is completed. As noted above, the award credits and/or (at the choice of the casino) component awards may alternatively be managed by validation device 700 in conjunction with individual PBI/CBIs, or without the need for a PBI/CBI where a player has a PIN number to identify the player. Table game 722 differs from table game 724 in that table game 722 further has in combination a prize/component station.

System 720 also comprises a plurality of gaming devices (also called gaming related devices) of all types, including game devices (i.e., specific games in specific cabinets) together with prize and/or component stations, but unlike systems 708 and 732 this system is not coupled to communication network 704. Each gaming device will use PBIs and/or CBIs rather than validation device 700 and monitoring device 702. As discussed earlier, the overall system may be configured to allow or disallow PBIs/CBIs generated from subsystem 708 or 732 to be used in the machines comprising subsystem 720 and vice versa. This is readily accomplished by issuing system source information as part of the encoding on each PBI/CBI, and may be as simple as a unique system identity number for each of systems 708, 720, and 732, printed as the initial field on a bar code printed on each PBI/CBI. This would typically include other information, such as the date, time, and a unique transaction ID, as well as the system of origin. Another preferred embodiment will include system source information along with a unique transaction ID, effectively combining the two pieces of information into one field. Other methods of including this information will readily come to mind of a person of ordinary skill in the art when combined with the benefit of the present disclosure.

Figure 8:
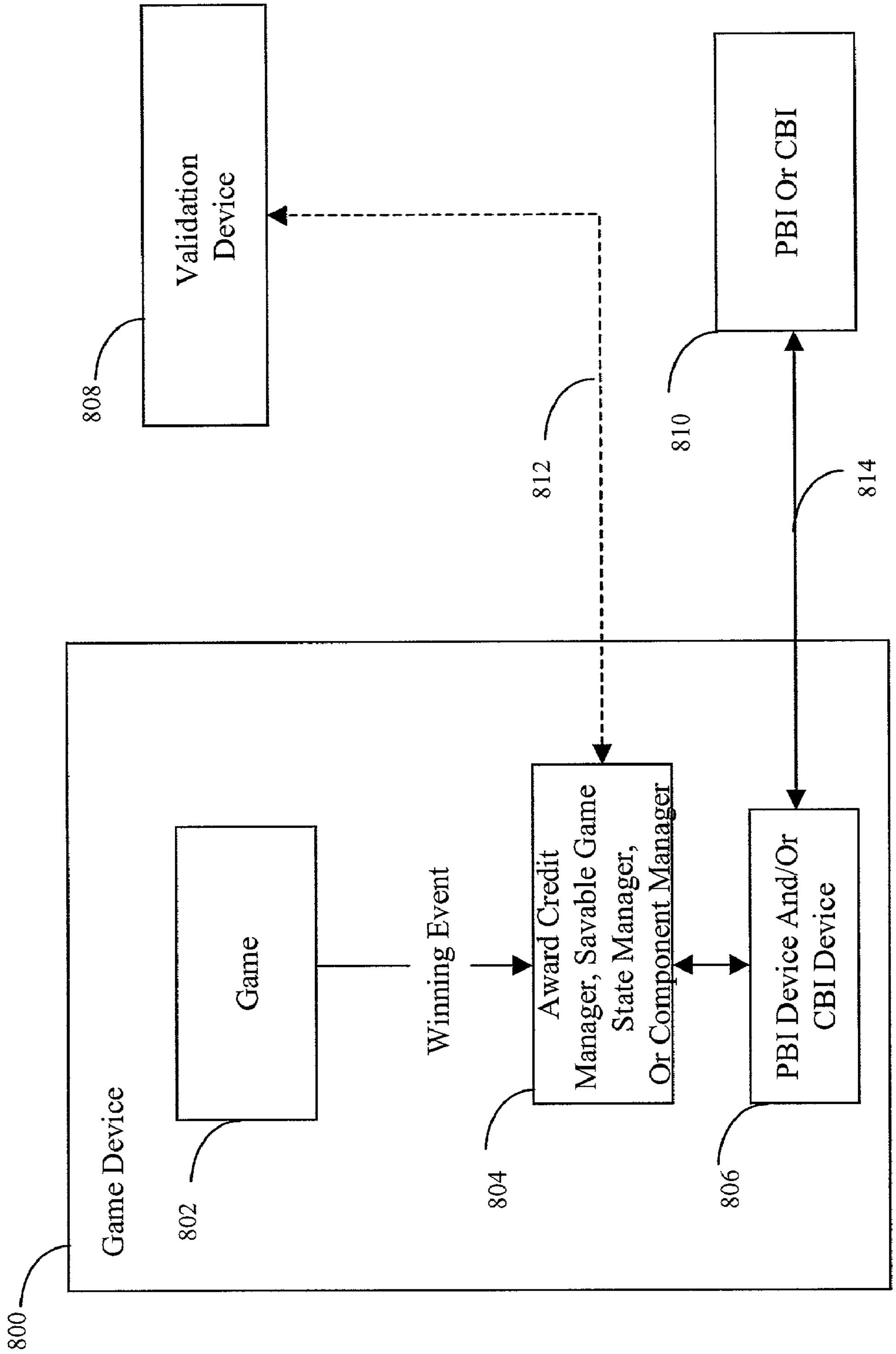
FIG. 8 is functional block diagram showing an example gaming device suitable for use with the present invention.

Referring now to FIG. 8, a game device is shown in additional detail. Game device 800 comprises a game 802 (skill, arcade, chance, semi-skill, fixed-pool) operatively coupled with Award Credit Manager (a form of savable game state manager) 804, which is also operatively coupled with a PBI input/output device 806. The PBI input/output device 806 is configured to read, write, generate, transmit, and receive information about PBI 810 as needed. Path 814 shows a manual usage path for PBI 810; the player must manually insert the PBI into the PBI reader. If PBI 810 comprises a printed ticket (voucher), the PBI input/output device 806 comprises a voucher reader for reading vouchers and indicia printed thereon, such as "Interleaved 2 of 5" bar codes. The PBI input/output device 806 would further include a voucher printer for generating vouchers when the player terminates play on game device 800.

Award state manager or Savable game state manager (award game states are a subset of all possible savable game states, explained more fully below) 804 carries out the operation of managing a player's savable award game states during play. If a player presents a PBI 810 prior to playing, the previously earned savable game states are identified from PBI 810 and/or from validation device 808 which communicates with the game device 800 over an electronic communications path 812. While playing game 802, the player may earn additional credits or change savable state based on winning game events. These events are noted by savable game state manager 804 in conjunction with the previously earned savable game states, if any. Upon termination of play or use of the gaming device by the player, another PBI 810 may be issued to the player which contains data associating the cumulative award credits or other game state earned by the player. A similar functional relationship exists when 804 is configured as a Component Manager rather than as an Award Credit Manager, and 810 is a Component Bearing Instrument (CBI) rather than a Prize Bearing Instrument (PBI). The CBI has the same enabling effect for use in a casino running component games, as the PBI has for award credits. It allows a player to manage their own component game state (component awards) across multiple games and across an extended period of time.

Figure 9:
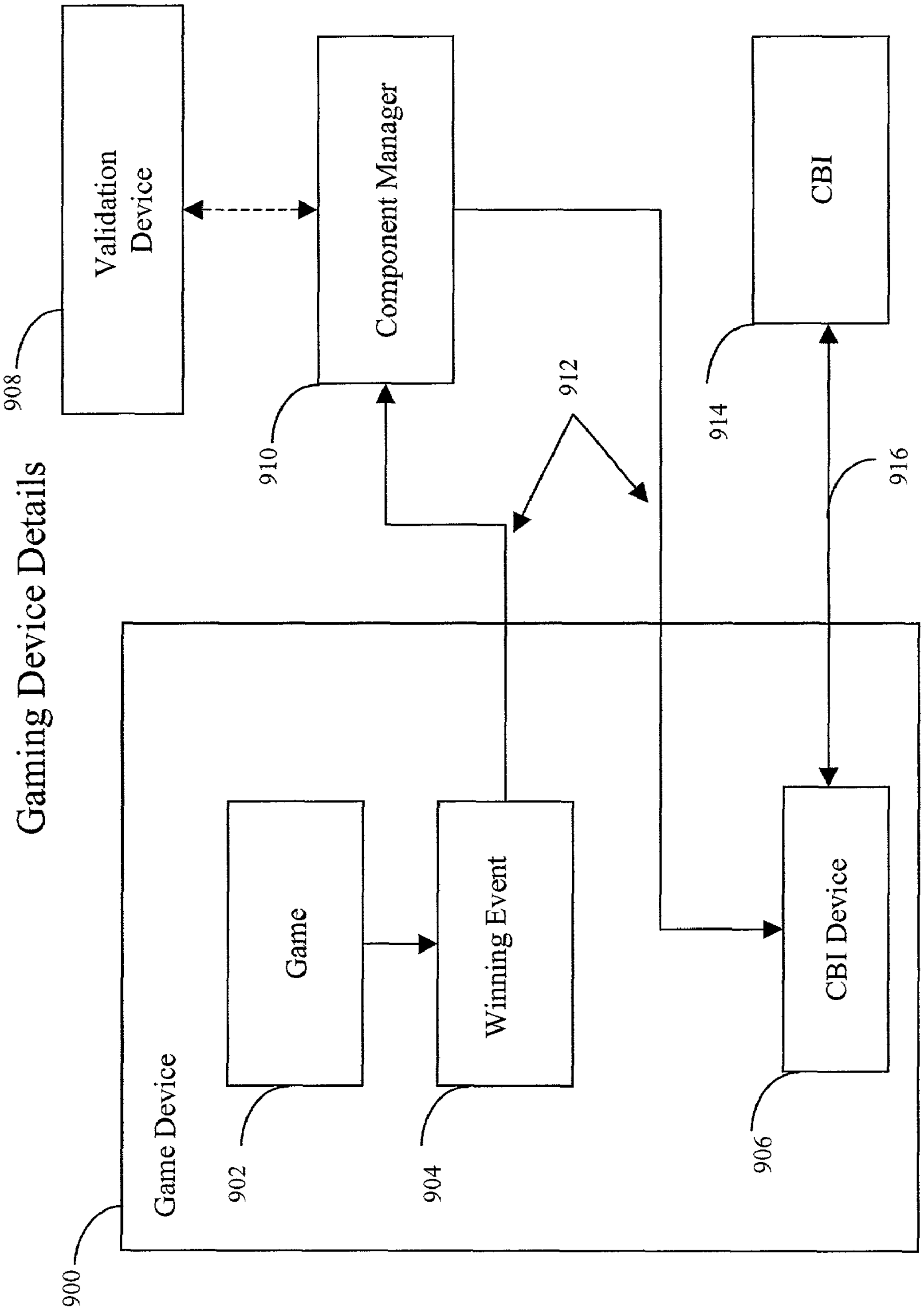
FIG. 9 is functional block diagram showing another example gaining device suitable for use with the present invention.

Continuing with FIG. 9, another preferred embodiment of a game device and support system is shown. Of particular interest in this embodiment is that the Component Manager (alternatively, the Award Credit Manager) 910 does not reside, in whole or in part, in game device 900. Upon the occurrence of a winning event, information is sent from game device 900 out onto a network, shown as outgoing and incoming connections 912. In a typical configuration, the outgoing and incoming electronic network connections will be made through a slot machine interface board (SMIB), a well-known game device part in the art. A SMIB interfaces the individual game device with external networks, where the external connection will typically use a serial connection to a floor controller or remote game controller (i.e., RGC 734 of FIG. 7). The RGC will then make typically use a LAN type connection with the rest of the networked devices (i.e., Ethernet using TCP/IP). The SMIB, RGC (if any), and network are shown generally as connection 912. In addition to being the interface between the game device and a network, a SMIB will typically be able to read game data (game events, reel results, etc.) and user input/output (including plays and money input and won), which can then be sent over the serial connections to the RGC or floor controller. This enables the game play data that is needed by a remote Component Manager to be communicated to the Component Manager without in any way disturbing the game play.

Component Manager 910 is software operably disposed within a computing device, where the computing device has its hardware and software environment configured such that the resources needed by the Component Manager are in place (i.e., enough main memory, secondary storage, I/O devices, and an operational operating system such as a UNIX-based or NT™-based OS). The Component Manager may reside on a floor controller or RGC, or may reside on a backend computing device, such as the same computing device in which a player database is kept. It may also be configured such that some of its operations are carried out on an RGC (i.e., event recognition), while others are carried out on a backend system (i.e., storing and retrieving component data for an individual, or issuing instructions for a particular game device to issue a printed ticket containing the code for a particular component or partial component credit).

In all cases, the SMIB or other network interface sends information about game events that are received by the Component Manager 910. Component Manager 910 is optionally operably in communication with a Validation Device 908, where the validity of any particular award can be checked, and where newly credited events (new awards) are recorded. Validation Device 908 is option as the vouchers or tickets may be deemed trustworthy in and of themselves, and may make use self-validating means well known in the data encryption arts.

The functionality carried out by the Component Manager, if done in an environment that does not make use of any other game state information (this would typically be the case when retrofitting an existing establishment only for component game play), is done in a standalone fashion. In this preferred embodiment, Component Manager 910 makes direct use of the game play data it is sent via a SMIB in each game device that is designated as participating in at least one component game. There will typically be a plurality of component games running simultaneously across various subsets of machines in a casino, where different component games are enabled on different sets of game devices. The Component Manager will have the needed component game rules (including but not limited to descriptions of winning events on designated game devices) from which it will issue winning component vouchers to players.

If the Component Manager is being used in a casino where other savable game state is being used, then in one preferred embodiment the Component Manager makes use of the already existing savable game state infrastructure. This is accomplished by watching the game state results being generated by game state enabled game devices, and then making the translation between all possible game states and those that result in a change of state relative to a Component Game. This would allow savable game state to be saved, then the Component Manager would look at the saved game state, and reconfigure and/or recombine it such that any component awards that should be issued will be issued, and any partially won component awards can be checked. Thus, the functionality of the Component Manager would be built on top of the underlying general game state saving apparatus. In these cases, the Component Manager would be smaller than a standalone Component Manager, which must do much of the game state saving itself.

Figure 10:
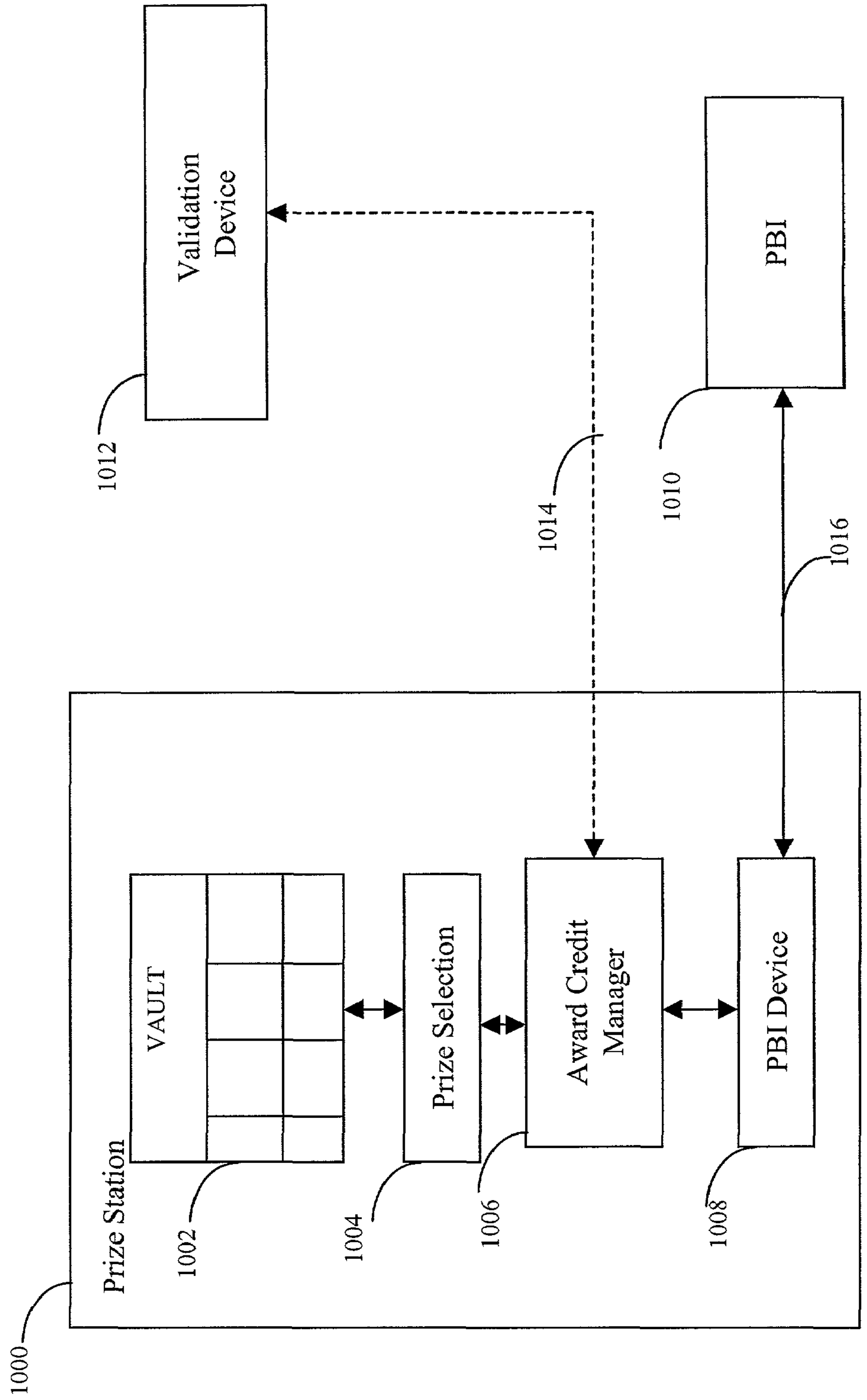
FIG. 10 is a functional block diagram showing an example prize station suitable for use with the present invention.

FIG. 10 shows a prize station in more detail. Prize station 1000 comprises a PBI input/output device 1008 operatively coupled to an award credit manager 1006, a prize selection module 1004 coupled to the award credit manager 1006, and a plurality of prizes maintained in vault 1002, the vault operatively coupled for communication with the prize selection module 1004.

When a player presents one or more PBIs to prize station 1000, shown as PBI 1010 and manual insertion path 1016, the PBI input/output device 1008 reads the award credits associated with the player. Award credit manager 1006 determines the total award credits' value, either directly from PBI 1010 and/or from validation device 1012. Validation device 1012 is operably connected to prize station 900 via electronic communications path 1014. Prize selection unit 1004 offers to the player one or more prize selections based on the player's total award credits. The player may select a prize selection or may cancel prize redemption. If a player selects a prize, the prize is awarded from vault 1002. If the prize selection does not exhaust the player's total award credits, another prize selection may be offered to the player, if the remaining credits are sufficient to support a prize selection from the vault 1002. If the remaining award credits are not sufficient to support a prize selection, the remaining award credits are maintained and associated with the player, normally by dispensing another PBI 1010. Other methods may also be employed to dispense prizes associated with award credits on PBIs, as disclosed in the co-pending parent applications previously identified and incorporated herein.

Figure 11:
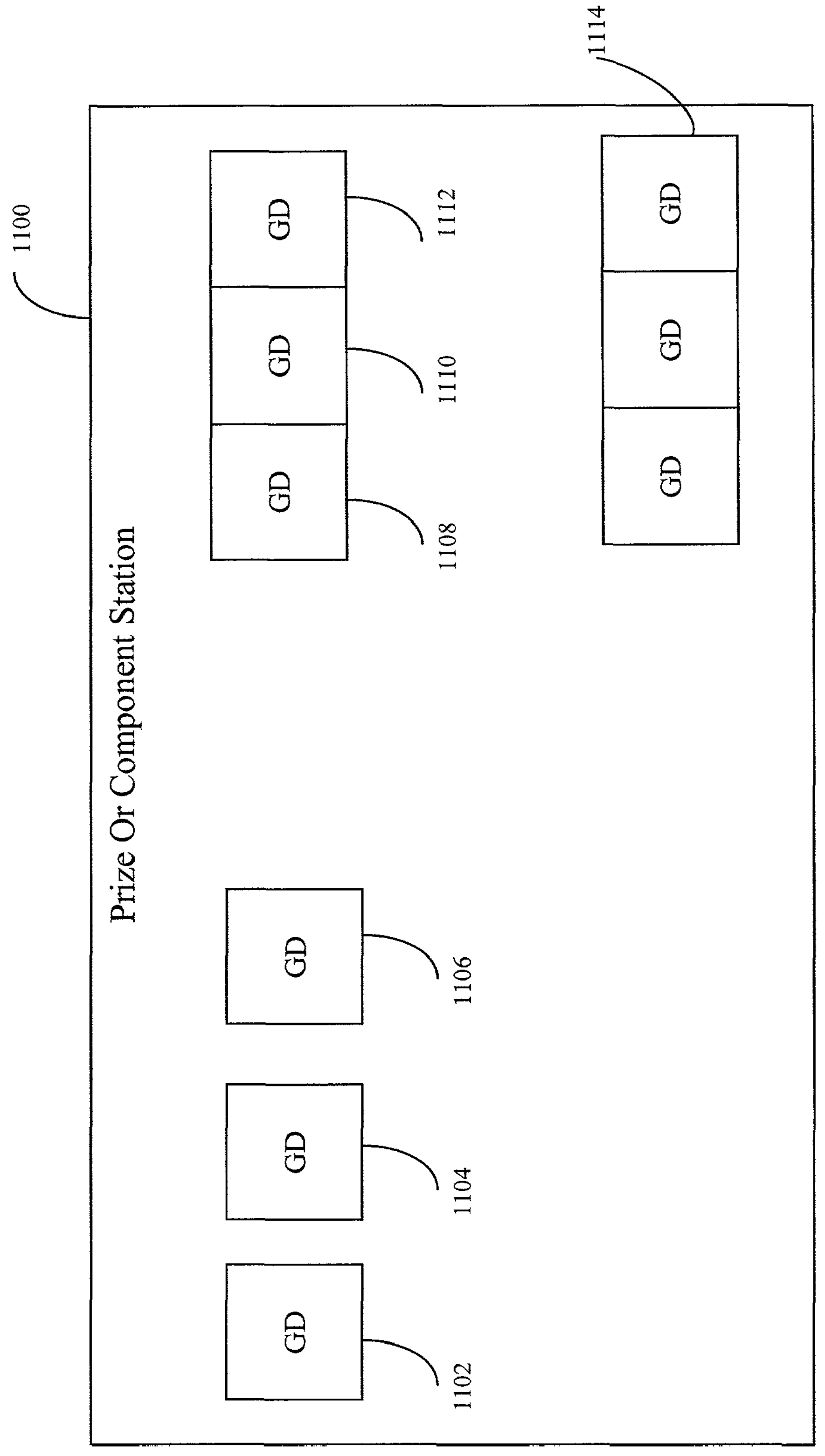
FIG. 11 is a functional block diagram depicting usage of gaming devices in a meta-games suitable for use with the present invention.

FIG. 11 illustrates two additional meta-game systems which may be implemented using the game state maintenance system of the present invention. FIG. 11 includes a prize (alternatively, component) station 1100 and a plurality of gaming device indicators illustrated as gaming device indicators 1102, 1104, and 1106. Each gaming device indicator corresponds to a gaming device on the game floor; there may be as many gaming device indicators as there are individual games in actual implementations or they may be grouped for convenience. Under this arrangement a particular prize awarded by the prize station 1000 may require an award credit from each of the gaming devices indicated by 1002 through 1006 or a predetermined subset, such as three award credits where at least two of three must come from different gaming devices. Alternatively, if 1100 is configured as a Component Station, then each of the game device indicators show a person which components may be won from which game devices. In a component award situation, this allows the casino to distribute component award play over any combination of game machines, adding to a player's involvement in the casino. Various other award requirements may also be used and will readily come to mind for a person of ordinary skill in the art and with the benefit of the present disclosure.

Another example of a meta-game involves banks of game devices. Bank 1 is defined as consisting of individual game device indicators 1108, 1110, and 1112. Bank "n" is defined generally as 1114, and is understood to further comprise individual game device indicators not individually labeled. There may be any number of banks between bank 1 and bank "n". Prize station 1100 may require an award credit from each bank of game devices (corresponding to the game device indicators) in order to receive a particular prize. If 1100 is configured as a Component Station, then designated components must be won by playing certain banks of machines at the casino. Each bank may be configured as the same game (e.g., blackjack), the same device type (e.g., slot machine), the same family of game (e.g., games manufactured by Sierra Design Group™), or other arrangement.

Having the ability to save award credit state creates the need and desire to save other states associated with a game device. A player will be particularly interested in saving the game state of a game that involves the accumulation of play points or play state, where the game state is not tied to award credits (or perhaps not yet tied in to award credits but could be).

Generally, game states other than award credit states fall into one of two categories. The first is saving credit state, that is, saving state when working towards an award or credit, where the game's state is derived from a game of chance or from a result from a fixed-pool set of results. This includes saving credit state that may result in the eventual issuance of a component, called sub-components or partial component state. The second is saving any other game state that effects the state of the game as it appears to a player if they leave and return later, typically a skill game where the player has reached a certain level or point value and doesn't want to have to start over.

Figure 12:
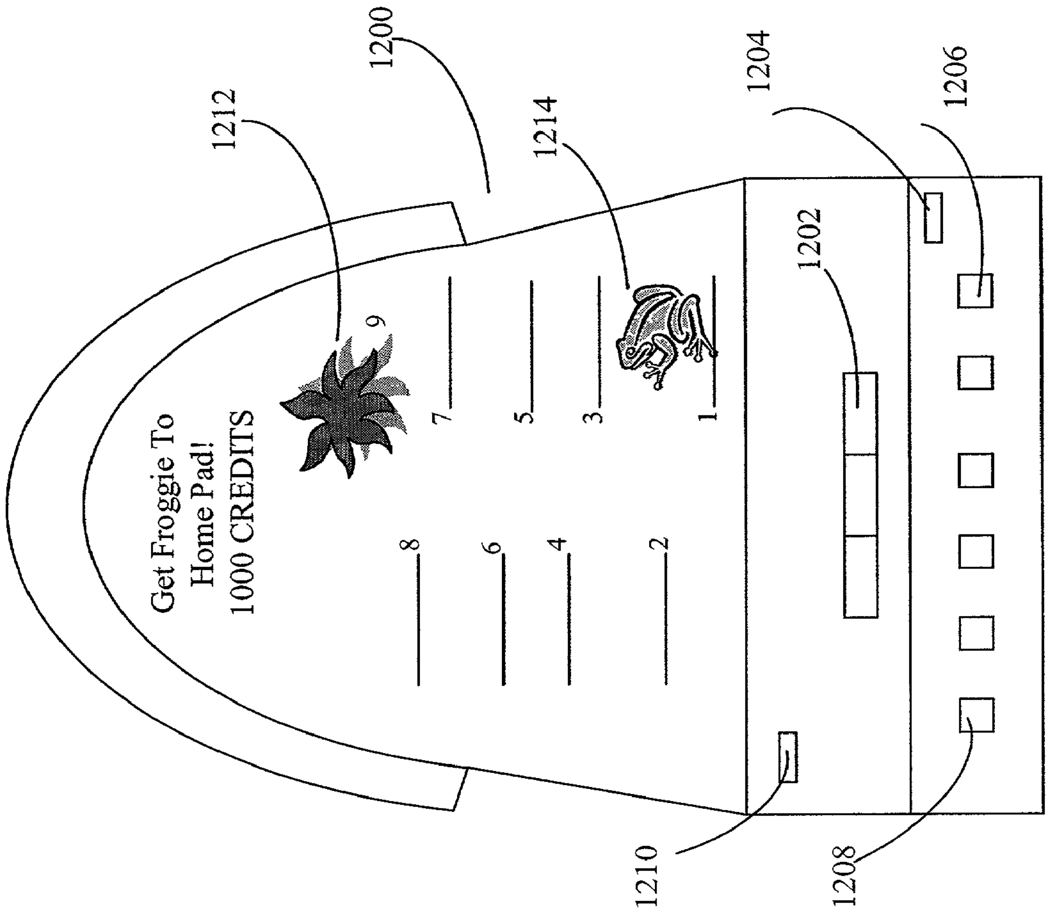
FIG. 12 is a functional block diagram depicting a game state saving game suitable for use with the present invention.

An example of the first type is shown in FIG. 12. This is a state saving game associated with games based on chance (or fixed-pools) and working towards an award state. Typically the goal, if reached, is playing credits or award credits. Game device 1200 has a standard primary game with indicia windows shown as 1202. The primary game may be any of the well known reel games, poker games, keno, bingo, fixed-pool games, etc. There is a panel of player buttons, shown between buttons 1206 and 1208, used for the primary game. Any layout and interface may be used, from a fixed number of physical buttons to a dynamic layout of touchscreen buttons. Also included is an output slot 1204 and an input slot 1210. Input slot 1210 accepts ID cards, ID vouchers, smart cards, game state vouchers, or any other means used to present game device 1200 with credits, states, or ID. If presented with ID, game device 1200 must be in operable communication with a back-end database (not shown), typically over a LAN (not shown). The communications means is used to retrieve data associated with the presented ID.

Voucher IDs are intended to be used by people who may be at a casino for more than a brief time, but who do not want to be entered as "players" in the casino's database (typically used by casinos for player tracking purposes and by players to be awarded player tracking points). This may include people who want to play a series of games over an evening or a week, want the convenience of having some gaming data kept on a back-end database, but do not want to give the casino their personal data. The player may chose to use a voucher ID, which is simply any media on which a unique identifier is recorded (typically an alpha-numeric sequence). This may include a card with a magnetic strip, smart card, bar-coded voucher, or any other form of readable media that can easily be carried by a person. Gaming device data, discussed below, can now be associated with the "voucher ID" rather than a traditional player's card. Typically voucher IDs would be given limited life spans, specified by the holder or establishment.

Like traditional player cards, the player using a voucher ID may be awarded "points" according to conventional methods for calculating player tracking incentives or awards. Later, the player may redeem the points by presenting his/her voucher ID at redemption sites established by the casino. Redemption sites could include, but are not limited to, restaurants, bars, hotels, or customer counters.

Voucher IDs are one example of anonymous player IDs, which allow players and casinos to make use of many of the features of a traditional players ID, but also allow player anonymity and other inventive characteristics. Anonymous Player IDs (APIDs) are more fully explained and disclosed in co-pending application entitled "ANONYMOUS PLAYER IDENTIFIERS IN A GAMING ENVIRONMENT" having Ser. No. 09/819,112, both this and the referenced application owned by the same entity, which is explicitly incorporated in this application in its entirety.

Returning now to FIG. 12, when playing the primary game there will be game states, indicia, or other aspects of the primary game that will trigger the secondary game. In this example, the secondary game is the "Froggie" game. Each time the secondary "Froggie" game is invoked by the primary game, frog 1214 will advance up one step. The secondary game starts at step 1 (the steps are labeled). With each invocation of the "Froggie" game, frog 1214 advances one step. After 7 invocations frog 1214 will be sitting on step 8. With one more trigger of the secondary game, the player will get the frog to its home pad 1212 (step 9) and will be awarded either 1000 game credits. Alternatively, the number of steps the frog advances on each secondary game invocation can be partially determined by the indicia shown on the primary game, allowing for more than one "hop" per invocation. When the frog reaches its home pad 1212, the game may present the player with the option of award credits instead of play credits.

The player has the option of saving the state of the game at the start of each primary game play. In this example, the state saved would be the state of the secondary game, specifically the frog's current step location. If the player plays "Froggie" enough to advance frog 1214 to step 5, the player may touch button 1206, the "save state" button, and receive a print-out in the form of a voucher from output slot 1204. Immediately after saving the game state to a voucher, the game resets itself to the base state, with frog 1214 back on step 1. The player may now leave the game for a while and come back, inserting the previously generated voucher into slot 1210. The game will set itself to the state saved, in this case placing frog 1214 on step 5. The game is now ready to be played.

Typically the game state just recovered will be available for a fixed length of time, perhaps 3 minutes. The game must be played within that allotted time or the game reverts to its start state and the game state voucher value is lost. If the player inserts the game state voucher and decides not to play the game, the voucher can always be recovered by pressing the "save state" button before the allotted time is up. Although discussed in terms of vouchers, any read/write media may be used in addition to having all the game state data stored in a back-end database, accessed by an ID card, PIN, APID, etc. All such methods of saving game state are fully contemplated by the current invention.

The advantages of saving game state are increased interest in investment bonus games by the players. With the ability to save their state, players who must leave without having reached the winning secondary game state have a much higher incentive to return and continue playing.

Figure 13:
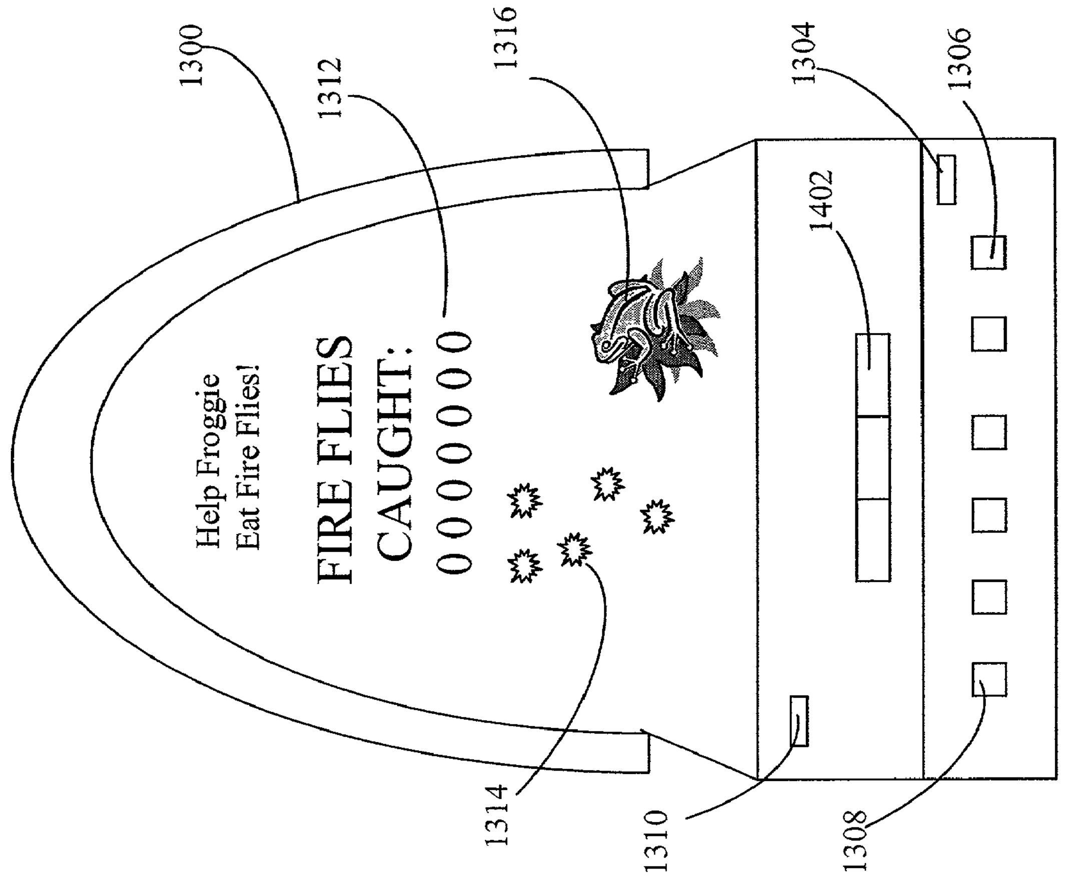
FIG. 13 is a functional block diagram depicting another game state saving game suitable for use with the present invention.

In addition to saving game state associated with awards, game state may be saved simply to keep a score on a non-award game or skill game. An example of this type of game state is shown in FIG. 13. In game device 1300 there is a primary game, indicated with indicia windows 1302. The primary game may be any game of chance or a fixed-pool game, including but not limited to poker, keno, reel-games, etc. Buttons shown between 1306 and 1308 are used to play the primary game in its known manner. Also included is input slot 1310 for reading any convenient input form that may be used to record game state. This includes but is not limited to vouchers, magnetic strip cards, smart cards, player IDs, ID vouchers, etc. Output slot 1304 is used to give any form of game state saving media to the player on request, typically some form of voucher or magnetic media. Button 1306 is used for secondary game play; button 1308 is a "save state" button that directs the game device to save the current state of the game. All this is shown for illustrative purposes only and can take a plethora of functionally equivalent forms, including configurations with just a single game.

In this case, when the secondary "Froggie" game is triggered or invoked from the primary game, the player can play the game for skill points. Frog 1316 has a tongue (not shown) that can be extended by pressing button 1306. A plurality of "fireflies" shown as 1314 are flying near frog 1316. A player presses button 1308 when a firefly is in line and near the frog's mouth, getting points thereby. The player accumulates points that are recorded on the screen at 1312.

When the player needs to leave the machine for a time, the player has the option of pressing "save state" button 1306 and saving the game state of the machine that can be saved. In this case, it is the player's score on the secondary game. The player will be issued a bearer record from output slot 1304 on which is recorded the game state. When the player returns later, the player inserts the readable media into read slot 1310 and the game will reset to the saved state.

In a preferred embodiment, the saved game state will also have an expiration date associated with it. The idea is to encourage a player to maximize their skill point score within a specified period of time (thereby encourage game use in general during the same period). The expiration time picked would depend on the game type, the player's average stay, as well as other factors, but would typically be in hours or days.

The saving of game states discussed above includes award states, "partial" award states (secondary or bonus game state, before award points or prizes have been awarded), and skill game states. Components may also be kept as a version or form of award credit game state. This may be accomplished in several ways. One preferred embodiment makes use of award credit game states directly. In this embodiment, a player is awarded some type of game state credits, (any form of award credits), which are then presented to a gaming device or component station that has a Component Manager available, thereby being enabled to award components or subcomponents to a prize based on the number of credits the player has. In this embodiment, this would be a one-way transaction—the player may convert award credits into components or subcomponents, but may not convert components or subcomponents into award credits. This is to encourage play within the casino as players try and work towards a prize, assuming the risk that someone else may win before they do.

In another embodiment, players may be allowed to convert component and subcomponent awards or credits into general game credits, but at a reduced rate and after the component prize has been won by someone else. This would preferably be carried out by instructing the Component Manager to accept component awards at gaming devices to prizes that have been won. The Component Manager would then issue standard game credits to the game the player inserted the component prize into. The return rate would be reduced—that is, if the component inserted into the game device would have had a value of 1000 award credits before the prize was won, the player may now receive 500 game credits back. This is not intended to make playing for the component prize a "freebie", i.e., without risk. Rather, it is designed to give the player the feeling that they at least get a little something back for trying, so the return rate is intentionally low. In addition, there would preferably be time limits on the redemption of components for an awarded component prize. This time limit would act as an additional incentive for a player to keep track of the component prize they were playing for, and to come back to the casino to use them within a fixed period. This time period would typically be measured in weeks, but could readily be implemented in hours, days, or months (this will depend on the value of the component prize and how long the component prize game was run, amongst other considerations).

In another preferred embodiment, partial award states may be kept with respect to individual components of a component prize game. In a manner similar to saving partial award game states with bonus and secondary games, the same game state mechanisms will be used to save the state of bonus and/or secondary games, when the player is trying to achieve a winning event that will result in a component or subcomponent (rather than a generic bonus game win). An example is shown in FIG. 12, the previously described “Froggie” game. When used in conjunction with a component prize game, award, giveaway, or progressive, the player chooses to use the secondary game for the purposes of winning component awards (components) rather than general award credits or game credits. The player must make the choice before starting the secondary game play (in some cases, the game will be configured such that the player will always be playing for components when playing a secondary or bonus game). The player makes progress as they continue to play, moving “froggie” a step at a time towards froggie’s home pad. Once the home pad is reached, the player is awarded a component. If the player must leave the game for some reason, the player has the choice of telling the game device to save the current partial award game state, in this case the partial component game state. The player will receive a ticket or voucher with the state of the secondary game on it. When the player returns to this game, or a game having a functionally equivalent secondary game from an award standpoint, the player can insert the ticket or voucher and the game will set itself to the same state (in the “froggie” game, what step “froggie” is on), and the player may continue to play the game and accumulate play on the secondary, eventually getting the frog home and winning a component or subcomponent thereby.

Continuing with a more general game state, in addition to partial game states associated with components, any game state that is allowed to be savable by a player may be saved. This determination may be made by the gaming device itself, a back-end server with a database for networked gaming devices, or by parameters set by the operators, the gaming device manufacturers, or other accountable people. The examples given above are illustrative, showing preferred embodiments. They are not exhaustive; the inventive concept disclosed herein fully encompasses any savable game states.

Game state may be saved in an instrument similar to that of award credits; bar codes on a voucher, etc. The descriptions already given above for types of prize bearing instruments (PBIs) and devices that read, write, and use them apply equally for game state instruments (GSIs) and component prize instruments (CBIs). The same is also true of the system architectures described for use with PBIs—all the descriptions hold equally true for use with GSIs and CBIs. Whereas the information contained on a PBI is related to prize redemption, the information on a CBI is for component prize play, and the information on a GSI is for other saved game state.

If award credit game state (ACGS) gaming devices, general game state gaming devices, and game devices participating in a component games are used in the same establishment or casino, the preferred embodiment is to combine them into a general bearer instrument (GBI). The amount of information that needs to be stored for PBI, CBI, and GSI information, on a GBI, is readily accommodated on any of the instruments described for the PBIs, and may readily be stored in the same database records with additional fields using the same keys. In this preferred embodiment, a single bearer instrument would contain data for award credit saving, game state saving, as well as component games, allowing users to carry a single instrument for all games and gaming devices. It would look essentially the same as the example of FIG. 4, but perhaps with two bar code strips, one over the other, or with the bar code stripes more densely packed.

In addition to carrying information on all saved game state for one gaming device, it is fully envisioned that the current invention will encompass the saving of game states for multiple games on a single bearer instrument. If the game state is being saved in a back-end database, this is the straightforward association (keying) of a player ID or APID with multiple game state records, where the game state records include fields identifying the gaming device to which the saved state applies. For bearer instruments such as vouchers, multi-game, multi-state vouchers will be issued. These will be supported by readers that will read and understand (decode) the multi-game, multi-state instruments. And as discussed above, although vouchers are being used as an example of bearer instruments, any form of read/write media suitable for use as a bearer instrument is within the scope of the present invention.

Figure 15:
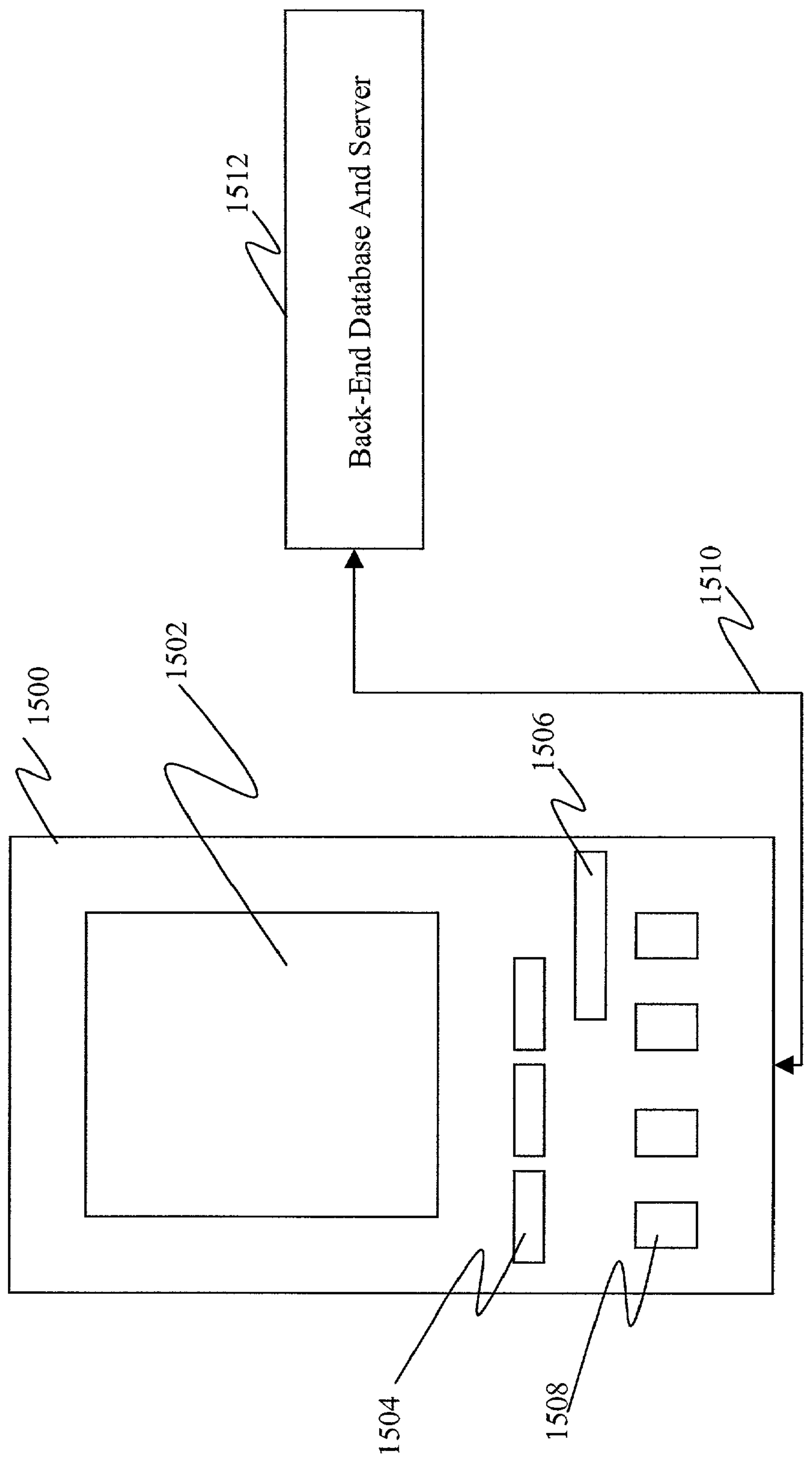
FIG. 15 is a functional block diagram of a GBI service station and CBI station according to the present invention.
Figure 16:
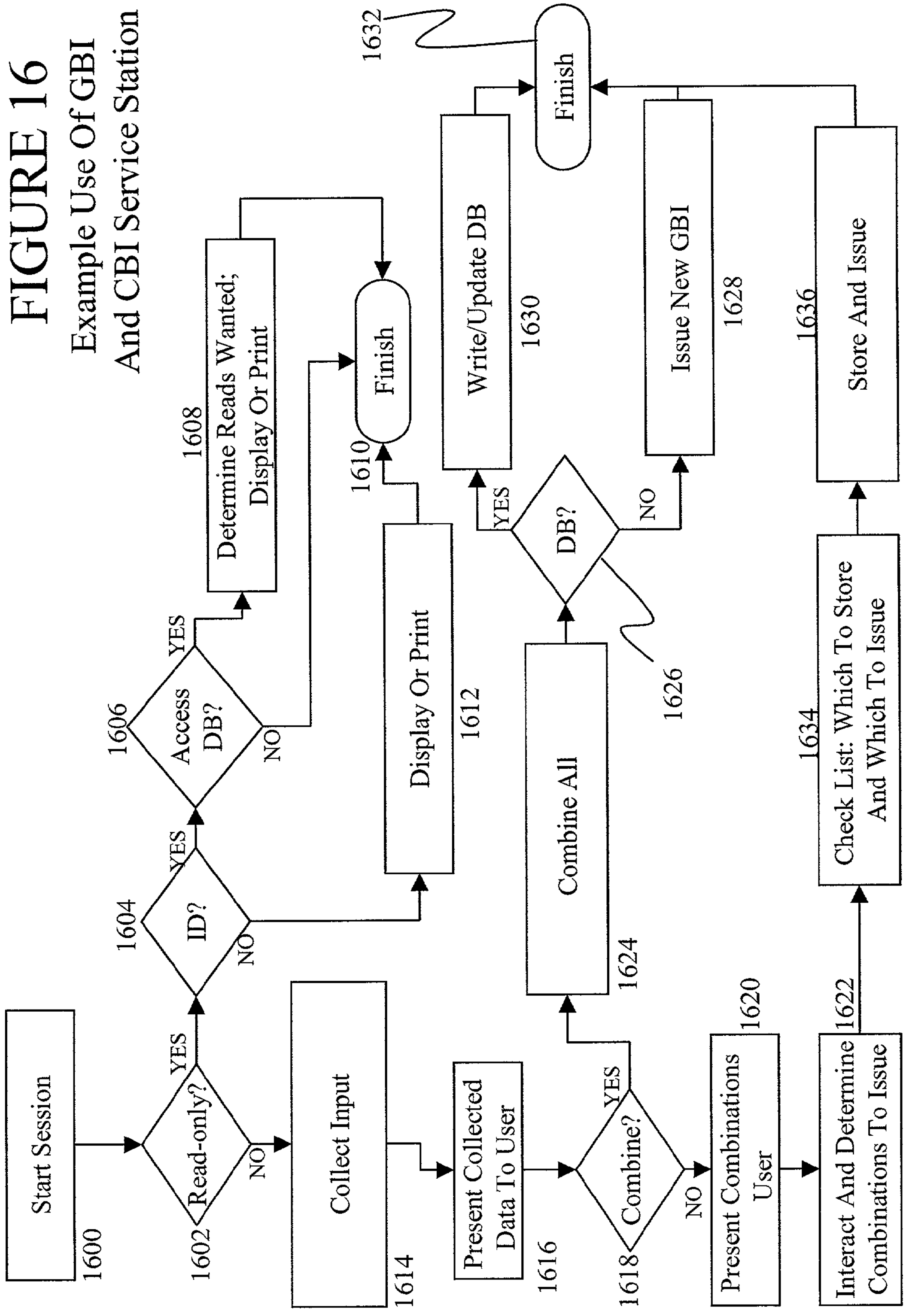
FIG. 16 is a flow diagram showing an example use of a GBI/CBI service station according to the present invention.

It is envisioned that casual players may well end up carrying multiple instruments after a while. To help them, as well as provide other related services including advertising and special promotional offers, the GBI service station will be provided. As explained above, a GBI is a general bearer instrument which may have, in a combined form, data that includes any and all PBI data, GSI data, CBI data, or any combination of PBI, GSI, and CBI data. FIG. 15 shows a functional block diagram of a GBI service station. Because the complexity of the interaction at the GBI service station is relatively high, a preferred embodiment will have a minimum number (if any) of “hard” buttons, shown generally as buttons 1408. These hard buttons may provide a few preliminary choices, such as screen display only, print-only, and read-out only functions (read-only functions are provided for people who forget what a PBI, GSI, CBI, or GBI has on it—it provides an English, Spanish, Japanese, or other language translation of what the instrument has on it, and then returns the instrument without further processing). An implementation using hard buttons may be preferred if the GBI service station has limited capabilities; for example one that only provides reading services and nothing else.

GBI service stations will also have at least one input slot, shown as 1504, and may have more than one. A minimal configuration will have an input slot for voucher-based PBIs, GSIs, CBIs, and GBIs. Optional slots may be for magnetic cards, smart cards, player’s cards, RFID tags, and similar instruments carried by people. There will also be at least one printer or pre-printed card output port, shown as slot 1506. Also shown is a video display 1502, further being a touch-screen for user input. GBI service station will preferably be connected to the establishment’s or casino’s back-end database 1512 via a LAN 1510 or functionally equivalent means. Being connected to a back-end database is optional; a subset of the GBI service station’s primary functions can still be carried out without the connection. In certain installations (particularly for security reasons) it may be desirable to have one or more GBI service stations installed unconnected.

The functionality provided by the GBI service station is geared towards helping users manage and understand any and all instruments and/or awards or credits they may have. This will be especially helpful to occasional users who do not play enough to “memorize” the meaning of the various instruments and awards. The user starts a session by pressing a hard button for certain limited functions, or inserting any applicable instrument in its’ respective slot (i.e., player’s card in a player card slot, PBI in the voucher reader slot, an RFID tag near an RFID reader). This action corresponds to entry box 1600 in FIG. 16.

The user initially decides if they want a read-only session at decision diamond 1602. If the answer is yes, the "YES" exit is taken to decision diamond 1604. If the user has presented a form of ID to the GBI service station (rather than some form of GBI), the "YES" exit is taken from decision diamond 1604 to decision diamond 1606. If the GBI service station can access a back-end database and the ID is recognized, the "YES" exit is taken to box 1608. Action in box 1608 includes asking if the user wants a display or a print-out, and then providing the user with the current state of any credits or components in the back-end database associated with the ID presented. Box 1608 is then left and the process finishes at finish 1610.

If, at decision diamond 1606, the ID was not recognized the process finishes immediately at finish point 1610 (with a polite message to that effect on the screen, of course!). If, at decision diamond 1604, the user presented something other than an ID the "NO" exit is taken and box 1612 entered. Action taken in box 1612 is to ask if the user wants the information in hardcopy or video form, present the information to the user in that manner, return the instrument to the user, and proceed to finish the transaction at finish 1610.

If, at decision diamond 1602 the answer was "NO", the user wants to do something more than have something read. The "NO" exit is taken to box 1614. Action taken in box 1614 is to determine from the user where to get input, and then to present all information to the user in total. There are basically two places from which data can be gathered. One is from instruments (GBIs, CBIs) carried by the user and the other is from a database. If the user requests information from a database, the user is asked for ID. The ID can take any form, including but not limited to an APID or some kind of player's ID. The user is then asked to submit instruments until they have no more (i.e., PBIs, GSIs, CBIs, and/or GBIs). Once the user indicates to the GBI service station all sources of credits or components has been accumulated, the GBI service station combines like data and lists other data. Combining like data consists of combining award credits, consolidating game state information for the same gaming device, deleted expired game state data, deleting expired component game data, consolidating component awards, etc. Much, if not most, of the data will not be able to be combined, it will simply be listed in order. An example of hard to combine data is secondary game state data for a skill or perceived skill game, which will be specific to a particular game and the particular score (points, etc.) achieved or won when the player last used it. On the other hand, award credits may always be combined. Box 1614 is left and box 1616 entered.

The action in box 1616 is to present the information to the user in the most coherent manner possible. As before, the user may choose hardcopy or video output. Box 1616 is then left for decision diamond 1618.

In decision diamond 1618 the user is asked if they want to combine credits that are combinable, and re-issue the rest in as compact a form as possible. It is expected that most players will make use of this automatic combination function. If the answer is yes, the "YES" exit is taken to box 1624. The action taken in box 1624 is to do the combinations possible, remove redundant or expired credits, etc. For component games, the automated action will be to combine any partial component credits or partial components into whole components, where the player has the correct subcomponents assembled (won). In addition, if the GBI service station detects that the player has all the components needed to win an entire component prize, they are also combined and the player is notified. These calculations may be done in the GBI service station or in a networked server in a networked environment.

In the event that a service station is a stand alone unit, there are two generic possible outcomes that are possible when the service station (or component station) is presented with component game winnings. This is different than other types of game state manipulations, because component games are expected to be changing (new games initiated, old games expired or won) on a regular basis. However, although component games are dynamic, the games need not be designed such that the changes are needed in real time (unlike changes to a player tracking data, which changes as the player is actually playing games). An example of such a case would be a casino that decides to use component games only for long running, relatively high-stakes games (game lasts more than a month, prize is a vehicle). In such cases, stand alone service stations can readily be upgraded with new component game information using traditional transportable media such as CDs. If this is the case, there can be a Component Manager installed in the service station that will, using the latest data or information on or read from a CD, be able to properly handle all the current (and expired) component game data it may receive from a player. This may include the ability to combine subcomponents into whole components when the player has all the proper subcomponents, ask the player if they wish to exchange general award credits into subcomponents or components (if enabled and desired by the casino), exchange non-visual component and subcomponent vouchers, tickets, or other transfer media for visually appealing printouts that are used to construct a visual image of the component prize, and similar actions.

If, on the other hand, the service station is too remote to load, or the component games being used by the casino is too dynamic (i.e., component games may be enabled, run, won, and expire within a few hours if the casino desires to create an immediate sense of excitement), then the service station will be programmed to simply let the player know they have component game data on their tickets, vouchers, etc., and that they will have to go to a customer counter or networked service station (typically inside the casino, for security purposes) for further information. Box 1624 is then left for decision diamond 1626.

At decision diamond 1626 the user is asked if they want to store the information on a database or if they want the credits (awards, game state, visual representations of component prize games) re-issued to them in an instrument form, typically GBI vouchers. If the data also has component game information, the information may be dispensed as pictures (which may be printed, if the service station has a sophisticated enough printer, or may consist of a series of pre-printed representation of the components that make up the component prize, which are then dispensed when called for by the Component Manager). If the answer is yes to the database storage, the "YES" exit is taken and box 1630 entered. Please note that if the GBI service station in use is not networked, clearly the "NO" exit is taken from this decision diamond.

In box 1630, the database deter nines if the current user has an ID. If they do, the data is recorded in records associated with that ID. If not, the user is asked if they want to be issued a player ID. If they do, one will be issued to them, with data being input on the touchscreen or by going to a customer counter. If they do not want a player tracking ID, they will be issued an APID and the data is then stored on the database using the newly issued APID. The process finishes by then entering finish 1632.

If the user indicated no at decision diamond 1626, then the "NO" exit is taken to box 1628. The action taken is to issue a new GBI to the user that incorporates all the valid credits listed for the user, included any combined credits. The process then finishes by leaving box 1628 and entered finish 1632.

If, at decision point 1618 the user answered no, the "NO" exit is taken to box 1620. Action taken in box 1620 is instruct the user on possible combinations. For example, a user may want a separate GSI game state vouchers (to give to a friend to use), or may want to divide up any award credits into even amounts on several different vouchers to distribute to friends. Any combination of vouchers may be created for the user. Box 1620 is left and box 1622 is entered.

Action in box 1622 is to put up interactive screens and determine the combination of vouchers the user wants the GBI service station to produce. After determining a set of vouchers equal in value to the credits and vouchers presented to the GBI service station at the start of the session, box 1622 is left and box 1634 entered.

The action in box 1634 is to present a list to the user of the newly combined credits and/or game states, and ask which are to be stored in a database and which are to be issued as newly generated GBIs or component pictorials. The user indicates which are to be stored and which are to be issued. Box 1634 is left and box 1636 entered. The action taken in box 1636 is to store and/or issue the GBIs or pictorials the user requested. As with box 1630, if the user currently has no ID for the database and requested that some of the newly recombined credits or game states be stored on a database, the player will be asked if they want a traditional player's ID or an APID. One or the other will be generated and will be given to the user at this time. The process now exits box 1636 and finishes by entering finish 1632.

The present invention has been partially described using flow charts. As will be understood by a person of ordinary skill in the art and with the benefit of the present disclosure, steps described in the flow charts can vary as to order, content, allocation of resources between steps, times repeated, and similar variations while staying fully within the inventive concepts disclosed herein.

Accordingly, it will be seen that this invention provides a system and method for maintaining player's award credits, game states in a secondary or bonus game, gaming states not otherwise associated with credits or prizes, and a system for the creation and use of component games. All the game states, including those associated with a component game, may be collectively called savable game state or savable game states. The savable game states may be saved on a game state voucher or any other media-based implementation or may be saved in strictly softcopy (electronic or other means) form. Any savable game state, in whatever form it is stored, comprises savable game state. The saving of game states, in particular its use in implementing component games, provides for the promotion of continued play in a gaming environment.

A player may restore award credits and/or other game state from previously played games when the previously played games are the same game device or from a similarly constructed game or any game with equivalent results or states. For example, saving the bonus game state of "Froggie" in FIG. 12 results in a voucher (or other instrument, or data in a database) that may then be used in any game where the secondary bonus game is triggered by the primary game with the same probability (pay tables establishing the same likelihood of incrementing the secondary or bonus game) coupled with a bonus game that has 9 incremental states to win, or a similar number of increments to be awarded a component to a component prize.

As will be readily apparent to one of ordinary skill in the art and with the benefit of the present disclosure, component games, and in particular component game states, a component manager, and component data will be represented inside computing machines of various complexity (from RGCs to general purpose computers typically found on the backend of most casino systems) as encoded strings of bits in machine readable media. Such collections of bits, or bit streams when they are being transported, will comprise and be organized as appropriate data structures readable and writeable on machine readable media, including main memory as well as transportable media including but not limited to disks and CDs, some portions of which may be executable by a target processor when compiled and/or appropriately linked and put into executable image form (as needed).

Although the description above contains much specificity, the description should not be construed as limiting the scope of the invention but as merely providing an illustration of the presently preferred embodiment of the invention. The scope of this invention should be determined by the appended claims and their legal equivalents.

What is claimed is:

1. A gaming system, comprising:

a plurality of electronic gaming devices including a first gaming device and a second gaming device, each gaming device including a player input device;

a plurality of different base games including a first base game only presentable on the first gaming device, and a second base game only presentable on the second gaming device;

a collection of individually distinct winnable game pieces that are associated with the plurality of different base games, wherein the completed collection is redeemable for a first award;

a component game made up of the collection of winnable game pieces having a second award that is redeemable when a preselected subset of the winnable game pieces from the collection is collected by a player, wherein a first winnable game piece is associated with the first base game and a second, different winnable game piece is associated with the second base game such that the first winnable game piece is only winnable through game play of the first base game on the first gaming device and the second winnable game piece is only winnable through game play of the second base game on the second gaming device, whereby the game pieces and the corresponding collection provide an incentive to play a variety of different base games in the gaming system; and;

a service station comprising a display, a service station input device, and a service station output device, wherein the service station is configured to enable the player to redeem the second award corresponding to the preselected subset of winnable game pieces.

2. A gaming system, comprising:

a plurality of electronic gaming devices including a first gaming device and a second gaming device, each gaming device including a player input device;

a plurality of different base games including a first base game presented on the first gaming device but not on the second gaming device, and a second base game presented on the second gaming device but not on the first gaming device;

a collection of individually distinct winnable game pieces that are associated with the plurality of different base games, wherein the completed collection is redeemable for an award; and a component game made up of the collection of winnable game pieces, wherein a first winnable game piece is associated with the first base game and a second, different winnable game piece is associated with the second base game such that the first winnable game piece is only winnable through game play of the first base game on the first gaming device and the second winnable game piece is only winnable through game play of the second base game on the second gaming device, whereby the game pieces and the corresponding collection provide an incentive to play a variety of different base games in the gaming system.

3. The gaming system of claim 2, further comprising a third winnable game piece associated with a third base game on a third gaming device such that the collection includes the first, second, and third winnable game pieces.

4. The gaming system of claim 2, wherein the first or second winnable game piece is only associated with the first or second base game, respectively, during a set time period.

5. The gaming system of claim 2, wherein the first winnable game piece is associated with the first base game during a first time period and the second winnable game piece is associated with the second base game during a second time period, and wherein the first time period is different from the second time period.

6. The gaming system of claim 2, wherein the first or second winnable game pieces include individually distinct winnable sub-game pieces such that the first or second winnable game piece is deemed to have been won after the sub-game pieces have been won.

7. The gaming system of claim 6, wherein a player's eligibility to win the sub-game pieces associated with the first or second winnable game pieces is based on the bet amount such that the player is eligible to win game pieces based on a first amount and the player is eligible to win the sub-game pieces based on a second amount.

8. The gaming system of claim 7, wherein the second amount is less than the first amount.

9. The gaming system of claim 2, wherein the plurality of gaming devices further comprise a game state manager that keeps track of a player's progress in the base game presented thereon and in the component game.

10. The gaming system of claim 9, wherein the plurality of gaming devices further comprise an output device configured to output component game state data associated with the player's progress in the component game.

11. The gaming system of claim 10, wherein the game state data includes individual game device identity, game pieces won, game pieces partially won, or combinations thereof.

12. The gaming system of claim 10, further comprising:

a third gaming device that presents a third base game that is associated with a third winnable game piece, wherein the third winnable game piece is also associated with either the first or second base games; and a game state input device configured to receive component game state data from the player, wherein the game state manager is configured to restore component game state data associated with the third gaming device on the first or second gaming device that respectively present the first or second base game such that the player's progress toward winning the third winnable game piece is continued on the first or second gaming device, both presenting a different base game.

13. The gaming system of claim 12, further comprising a service station distinct from the plurality of gaming devices, wherein the service station has a display, a service station input device, and a service station output device; and wherein the service station enables redemption of the award corresponding to the completed collection of individually distinct game pieces.

14. The gaming system of claim 12, further comprising a service station integrated with one or more of the plurality of gaming devices, wherein the service station enables redemption of the award corresponding to the completed collection of individually distinct game pieces.

15. The gaming system of claim 2, wherein the plurality of gaming devices are operatively connected through a network to a game state manager that is disposed within a computing device, wherein the game state manager keeps track of a player's progress in the base game and in the component game.

16. A gaming system, comprising:

a plurality of electronic gaming devices including a first gaming device and a second gaming device, each gaming device including a player input device;

a plurality of different base games including a first base game presented on the first gaming device but not on the second gaming device, and a second base game presented on the second gaming device but not on the first gaming device;

a collection of individually distinct winnable game pieces that are associated with the plurality of different base games, wherein the completed collection is redeemable for an award; and a component game made up of the collection of winnable game pieces, wherein a first winnable game piece is associated with the first base game during a first time period, and a second, different winnable game piece is associated with the second base game during a second time period such that the first winnable game piece is winnable through game play of the first base game on the first gaming device and the second winnable game piece is winnable through game play of the second base game on the second gaming device, whereby the game pieces and the corresponding collection provide an incentive to play a variety of different base games in the gaming system.

17. The gaming system of claim 16, wherein the first and second time periods are the same.

18. The gaming system of claim 16, wherein the first and second time periods are different.

19. The gaming system of claim 16, wherein the first or second winnable game pieces include individually distinct winnable sub-game pieces such that the first or second winnable game piece is deemed to have been won after the sub-game pieces have been won.

20. The gaming system of claim 19, wherein a player's eligibility to win the sub-game pieces associated with the first or second winnable game pieces is based on the bet amount such that the player is eligible to win game pieces based on a first amount and the player is eligible to win the sub-game pieces based on a second amount.

21. The gaming system of claim 20, wherein the second amount is less than the first amount.

* * * * *

UNITED STATES PATENT AND TRADEMARK OFFICE
CERTIFICATE OF CORRECTION

PATENT NO. : 8,313,371 B1
APPLICATION NO. : 09/870329
DATED : November 20, 2012
INVENTOR(S) : Robert Anthony Luciano, Jr.

It is certified that error appears in the above-identified patent and that said Letters Patent is hereby corrected as shown below:

In the Specifications:

Column 3, In line 49, delete “in toto”

Column 4, In line 59, change “a” to --some--

Column 6, In line 51, change “them” to --then--

Column 7, In line 57, chance “illustrations” to --illustrates--

Column 14, In line 25, insert --of-- after “use”

Column 18, In line 23, change “encourage” to --encouraging--

Column 22, In line 59, change “deter nines” to --determines--

Signed and Sealed this
Twenty-eighth Day of May, 2013

Teresa Stanek Rea
*Acting Director of the United States Patent and Trademark Office*